United States Patent
Wittchen et al.

(10) Patent No.: US 11,136,190 B2
(45) Date of Patent: Oct. 5, 2021

(54) AUTOMATED LABORATORY SYSTEM AND RELATED SYSTEMS, METHODS, AND DEVICES

(71) Applicant: Thermo CRS Ltd., Burlington (CA)

(72) Inventors: Jonathan Wittchen, Burlington (CA); Gary Darnel, Hamilton (CA); Michael Paul Riff, Burlington (CA); Stephen Wayne Johnson, Waterdown (CA); Dean S. Mulyk, Burlington (CA); Mark Michael Garner, Toronto (CA); Robert Dunn-Dufault, Guelph (CA); Ian Yates, Toronto (CA); Hansjoerg Werner Haas, Burlington (CA)

(73) Assignee: Thermo CRS Ltd., Burlington (CA)

( * ) Notice: Subject to any disclaimer, the term of this patent is extended or adjusted under 35 U.S.C. 154(b) by 285 days.

(21) Appl. No.: 16/265,225

(22) Filed: Feb. 1, 2019

(65) Prior Publication Data
US 2019/0241363 A1    Aug. 8, 2019

Related U.S. Application Data

(60) Provisional application No. 62/625,572, filed on Feb. 2, 2018.

(51) Int. Cl.
*B65G 1/127* (2006.01)
*B25J 9/16* (2006.01)
(Continued)

(52) U.S. Cl.
CPC ............ *B65G 1/127* (2013.01); *B25J 9/1694* (2013.01); *G01N 35/04* (2013.01);
(Continued)

(58) Field of Classification Search
CPC .... B65G 1/127; B65G 2201/02; G01N 35/04; G01N 35/0099; G01N 2035/0465; G01N 2035/0425; B25J 9/1694
See application file for complete search history.

(56) References Cited

U.S. PATENT DOCUMENTS

| D290,578 | S | 6/1987 | Belaiche et al. |
| D299,109 | S | 12/1988 | Jans |

(Continued)

FOREIGN PATENT DOCUMENTS

| WO | 3826746 | 6/1998 |

OTHER PUBLICATIONS

The International Bureau of WIPO, International Preliminary Report On Patentability, International Application No. PCT/CA2019/050130, dated Aug. 13, 2020 (8 pages).

(Continued)

*Primary Examiner* — Michael Collins
(74) *Attorney, Agent, or Firm* — Wood Herron & Evans LLP

(57) ABSTRACT

An automated laboratory system includes a vertical shelving system including a frame and at least one shelf movably mounted to the frame such that the at least one shelf is movable relative to the frame between a docked position and an undocked position, the at least one shelf being configured to carry at least one instrument. The system also includes a robotic device proximate the vertical shelving system and being configured to access the at least one instrument carried by the at least one shelf.

10 Claims, 26 Drawing Sheets

(51) Int. Cl.
*G01N 35/04* (2006.01)
*G01N 35/00* (2006.01)

(52) U.S. Cl.
CPC ...... *B65G 2201/02* (2013.01); *G01N 35/0099* (2013.01); *G01N 2035/0425* (2013.01); *G01N 2035/0465* (2013.01)

(56) References Cited

U.S. PATENT DOCUMENTS

| | | | |
|---|---|---|---|
| D315,858 S | 4/1991 | Frattini | |
| D364,217 S | 11/1995 | Dubin | |
| 5,813,708 A | 9/1998 | Shen | |
| D619,872 S | 7/2010 | Singtoroj | |
| 8,423,174 B2 * | 4/2013 | Koch | G01N 35/0099 700/214 |
| 8,712,581 B2 * | 4/2014 | Brandlhuber | G01N 35/0099 700/229 |
| D737,652 S | 9/2015 | Harden et al. | |
| D738,468 S | 9/2015 | Bahler | |
| D745,359 S | 12/2015 | Sun | |
| D797,541 S | 9/2017 | Groleski et al. | |
| 10,676,279 B1 * | 6/2020 | Bidram | B65G 1/10 |
| 2004/0134750 A1 | 7/2004 | Luoma | |
| 2008/0063562 A1 * | 3/2008 | Hoover | G01N 35/0099 422/63 |
| 2010/0028124 A1 * | 2/2010 | Lackner | G01N 35/0099 414/806 |
| 2010/0316468 A1 * | 12/2010 | Lert | B65G 47/57 414/273 |
| 2012/0043183 A1 * | 2/2012 | Hannessen | B65G 47/57 198/617 |
| 2016/0333337 A1 * | 11/2016 | Duffy | F16K 99/0032 |

OTHER PUBLICATIONS

International Search Authority, Canadian Intellectual Property Office, International Search Report and Written Opinion issued in corresponding PCT Application No. PCT/CA2019/050130, dated Apr. 17, 2019 (11 pages).

Highres Biosolutions, CoLAB Flex Mobile, Modular Lab Automation, www.highresbio.com, 2018.

* cited by examiner

AUTOMATED LABORATORY SYSTEM AND RELATED SYSTEMS, METHODS, AND DEVICES

CROSS REFERENCE TO RELATED APPLICATION

This application claims the benefit of U.S. Provisional Patent Application Ser. No. 62/625,572, filed on Feb. 2, 2018, the disclosure of which is hereby incorporated by reference in its entirety.

FIELD OF THE INVENTION

The present invention relates generally to laboratory systems and, more particularly, to automated laboratory systems for performing scientific processes such as assays.

BACKGROUND OF THE INVENTION

Conventional automated laboratory systems include one or more tabletops with a lab automation robot positioned thereon and a variety of instruments positioned on the one or more tabletops around the lab automation robot. The lab automation robot may be, for example, a selective compliance articulated robot arm (SCARA) type, and the instruments may include, for example, a liquid handler, an incubator, a reagent dispenser, a sealer, a microplate spectrophotometer, a thermocycler, a thermocycler controller, or any other suitable instrument for performing a desired scientific process such as an assay. In order to perform an assay, the robot may grip a microtiter plate containing samples and transfer the samples between the various instruments. In some instances, such as when space around the robot is limited, the robot may be placed on a horizontal track in order to increase the working envelope of the robot so that the robot may access instruments positioned on the tabletop along the track. In any event, conventional automated laboratory systems typically require a relatively large horizontal footprint. In particular, such systems require sufficient horizontal space to accommodate each of the robot and instruments. Thus, each automated laboratory system may leave little space in the laboratory for peripheral equipment, laboratory personnel, and/or other automated laboratory systems, for example. This may be particularly problematic for automated laboratory systems having a large number of instruments.

Conventional automated laboratory systems also fail to enable laboratory personnel to safely, conveniently, and efficiently access the various instruments of the system without compromising the performed assay.

Thus, it would be desirable to provide an improved automated laboratory system.

SUMMARY

In one embodiment, an automated laboratory system includes a vertical shelving system including a frame and at least one shelf movably mounted to the frame such that the at least one shelf is movable relative to the frame between a docked position and an undocked position, the at least one shelf being configured to carry at least one instrument. The system also includes a robotic device proximate the vertical shelving system and being configured to access the at least one instrument carried by the at least one shelf.

The system may also include at least one locking mechanism configured to lock the at least one shelf against movement relative to the frame when the at least one shelf is in the docked position. The system may further include a main controller and at least one handle operatively coupled to the at least one shelf. The at least one handle includes at least one body portion grippable by a user's hand for receiving a force exerted by the user's hand to move the shelf between the docked position and the undocked position, at least one indicator for providing a discernible indication of a status of at least one of the at least one shelf or the at least one instrument, and at least one sensor for detecting contact or proximity between the at least one handle and the user's hand. The system also includes a shelf controller in operative communication with the at least one locking mechanism, the at least one indicator, the at least one sensor, and the main controller. The shelf controller is configured to send an unlock signal to the at least one locking mechanism in response to the sensor detecting contact or proximity between the at least one handle and the user's hand for a predetermined amount of time, and the shelf controller is configured to send a request to the main controller to take the at least one instrument offline in response to the sensor detecting contact or proximity between the at least one handle and the user's hand for a predetermined amount of time. The main controller may be in operative communication with the robotic device.

In one embodiment, the at least one shelf is rotatably mounted to the frame. In addition or alternatively, the at least one indicator may include at least one visual indicator for providing a visual indication of a status of at least one of the at least one shelf or the at least one instrument. For example, the at least one visual indicator may include at least one light source. In addition or alternatively, the at least one indicator may include at least one tactile indicator for providing a tactile indication of a status of at least one of the at least one shelf or the at least one instrument. For example, the at least one tactile indicator may include at least one vibration source.

In one embodiment, the at least one sensor includes at least one contact or proximity sensor. In addition or alternatively, the status may include at least one of an online status of the at least one instrument, an offline status of the at least one instrument, a transition between online and offline statuses of the at least one instrument, a docked status of the at least one one shelf, an undocked status of the at least one shelf, or a transition between docked and undocked statuses of the at least one shelf. In one embodiment, the system further includes at least one instrument carried by the at least one shelf, wherein the main controller is in operative communication with the at least one instrument.

In another embodiment, a vertical shelving system for use with a robotic device in an automated laboratory system includes a frame including at least one post extending in a vertical direction, and a plurality of shelves selectively attachable to the at least one post, wherein the vertical position of each of the shelves on the at least one post is releasably adjustable. The at least one post may include a plurality of posts configured to be circumferentially positioned about the robotic device. In addition or alternatively, at least one of the plurality of shelves may be configured to be cantilevered when attached to the at least one post. At least one of the plurality of shelves may be configured to be movable relative to the at least one post between a docked position and an undocked position when attached to the at least one post. For example, at least one of the plurality of shelves may be configured to be rotatable relative to the at least one post between the docked position and the undocked position when attached to the at least one post. In addition or alternatively, at least one of the plurality of shelves may include integrated power and communication for at least one instrument carried by the at least one shelf.

In yet another embodiment, a handle for use in a vertical shelving system of an automated laboratory system includes at least one body portion configured to be operatively attached to at least one of a plurality of shelves of the shelving system, the at least one shelf being configured to carry at least one instrument, wherein the at least one body portion is grippable by a user's hand for receiving a force exerted by the user's hand to move the at least one shelf between a docked position and an undocked position. The handle also includes at least one indicator for providing a discernible indication of a status of the at least one shelf or the at least one instrument, and at least one sensor for detecting contact or proximity between the at least one handle and the user's hand. The at least one sensor and the at least one indicator are each configured to communicate with a controller associated with the at least one shelf. The at least one indicator may be configured to provide a dynamic effect. For example, the dynamic effect may include a vibration. Alternatively, the dynamic effect may include a flashing illumination, or the dynamic effect may include a color-changing illumination.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, serve to explain the one or more embodiments of the invention.

DETAILED DESCRIPTION OF THE INVENTION

Figure 1:
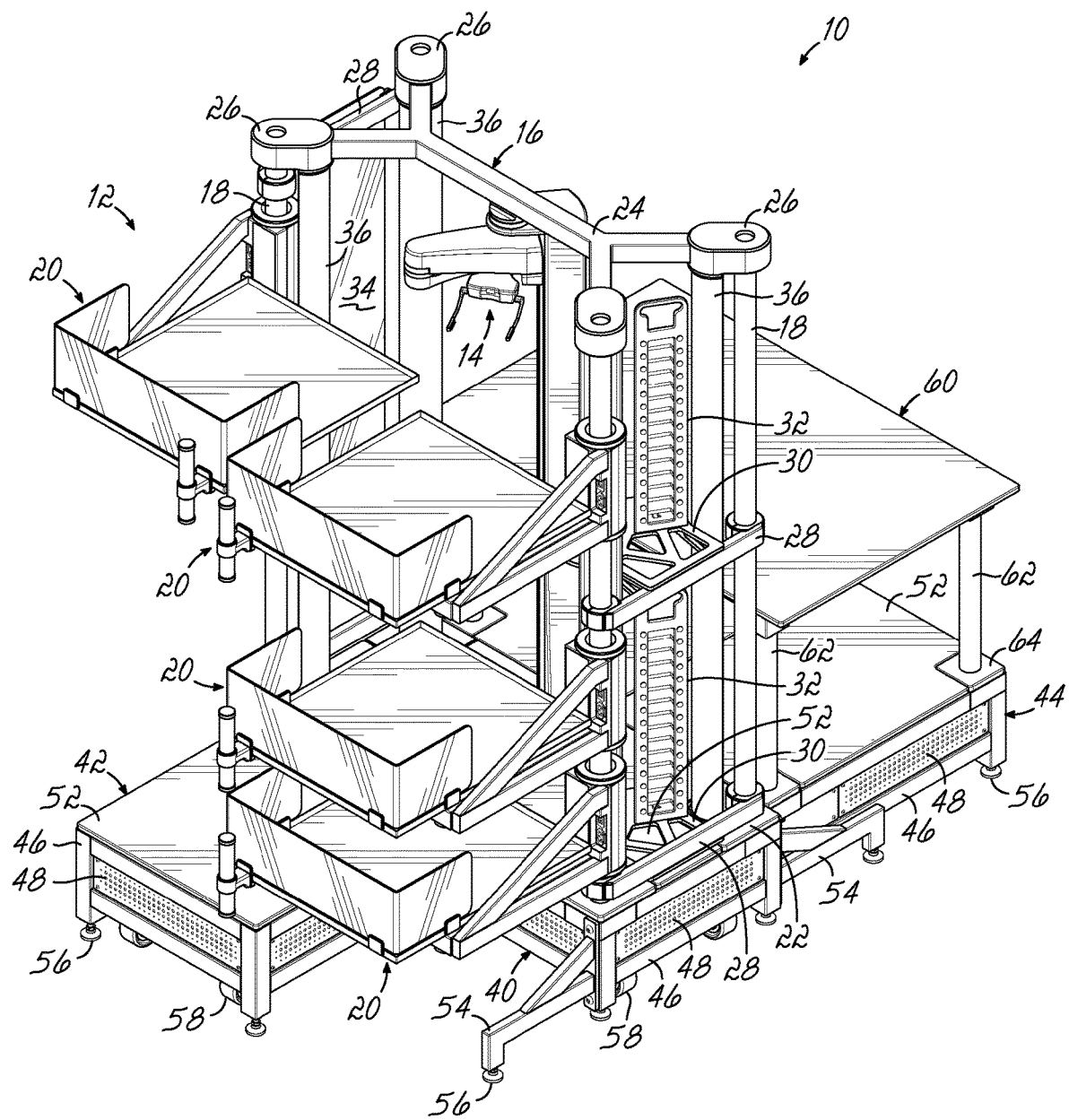
FIG. 1 is a perspective view of an exemplary automated laboratory system in accordance with an embodiment of the present invention.

With reference to FIG. 1, an exemplary automated laboratory system 10 including a vertical shelving system 12 for use with a robotic device 14 to perform at least one scientific process is shown in accordance with one embodiment of the present invention. The robotic device 14 may be a SCARA type robotic device, such as that sold by Thermo Fisher Scientific Inc. under the trademark Spinnaker XT. Other types of robotic devices may be used, such an articulated robotic device, a spider robotic device, or any other suitable types of robotic device. As set forth in further detail below, the automated laboratory system 10, including the vertical shelving system 12, provides a reduced horizontal footprint as compared to conventional automated laboratory systems, thereby allowing an increase in available space in the laboratory for peripheral equipment, laboratory personnel, and/or other automated laboratory systems, for example. The automated laboratory system 10 also enables laboratory personnel to safely, conveniently, and efficiently access various instruments (FIG. 27) carried by the vertical shelving system 12 while minimizing the risk of compromising the performed assay. The features of the automated laboratory system 10 and vertical shelving system 12 are set forth in further detail below to clarify each of these functional advantages and other benefits provided in this disclosure.

Further referring to FIG. 1, the illustrated vertical shelving system 12 is modular and includes a frame 16 including at least one vertically extending post 18 and a plurality of shelves 20 selectively attachable to the at least one post 18 for carrying one or more scientific instruments (FIG. 27) or lab consumables, for example. In the embodiment shown, four vertically extending posts 18 are arranged in a generally rectangular configuration such that the posts 18 may be circumferentially positioned about the robotic device 14, thereby providing the robotic device 14 with complete 360° access to the instruments carried by the various shelves 20 on the posts 18. In one embodiment, at least four posts 18 may be used. In addition or alternatively, the number of posts 18 may be selectively varied to contribute to the modularity of the vertical shelving system 12. In any event, a foot 22 is provided at a lower end of each of the illustrated posts 18 for mounting the posts 18 in an upright position. In one embodiment, each post 18 may be integrally formed with the respective foot 22 as a unitary piece. Alternatively, each post 18 may be formed separately from the respective foot 22 and coupled thereto. For example, each post 18 may be received in a bore (not shown) of the respective foot 22 and secured to the frame foot 22 by suitable means.

In the embodiment shown, the posts 18 are operatively coupled to each other via a cross member 24 including a plurality of end caps 26 positioned over and fixed to the upper end of each of the posts 18 to assist in stabilizing the frame 16. For example, one or more fasteners (not shown) may couple each of the end caps 26 to the respective post 18. In addition or alternatively, each of the end caps 26 may be clamped over the respective post 18. As shown, one or more tie bars 28 may operatively couple adjacent posts 18 to each other along the lengths thereof, such as at or near the top ends, bottom ends and/or midpoints thereof. For example, one or more fasteners (not shown) may couple each of the tie bars 28 to the respective posts. In addition or alternatively, each of the tie bars 28 may be clamped over the respective posts 18. The tie bars 28 may be used to support additional components of the vertical shelving system 12. For example, the tie bars 28 may support one or more hotel mounting platforms 30 for carrying one or more random access and/or sequential access stacks or hotels 32 for storing microtiter plates (not shown). In addition, or alternatively, the tie bars 28 may support one or more guard panels 34 for providing a barrier at or near the periphery of the frame 16.

As shown, a conduit 36 having a generally C-shaped cross section (see FIG. 6) is positioned radially inwardly of, or behind, each of the posts 18. The end caps 26 of the cross member 24 may be positioned over and fixed to the upper end of each of the conduits 36. For example, a friction fit may be provided between each of the end caps 26 and respective conduits 36. In addition, or alternatively, the lower end of each conduit 36 may be coupled to the foot 22 of the corresponding post 18. In one embodiment, each conduit 36 may be integrally formed with the respective end cap 26 and/or respective foot 22 as a unitary piece.

Figure 2:
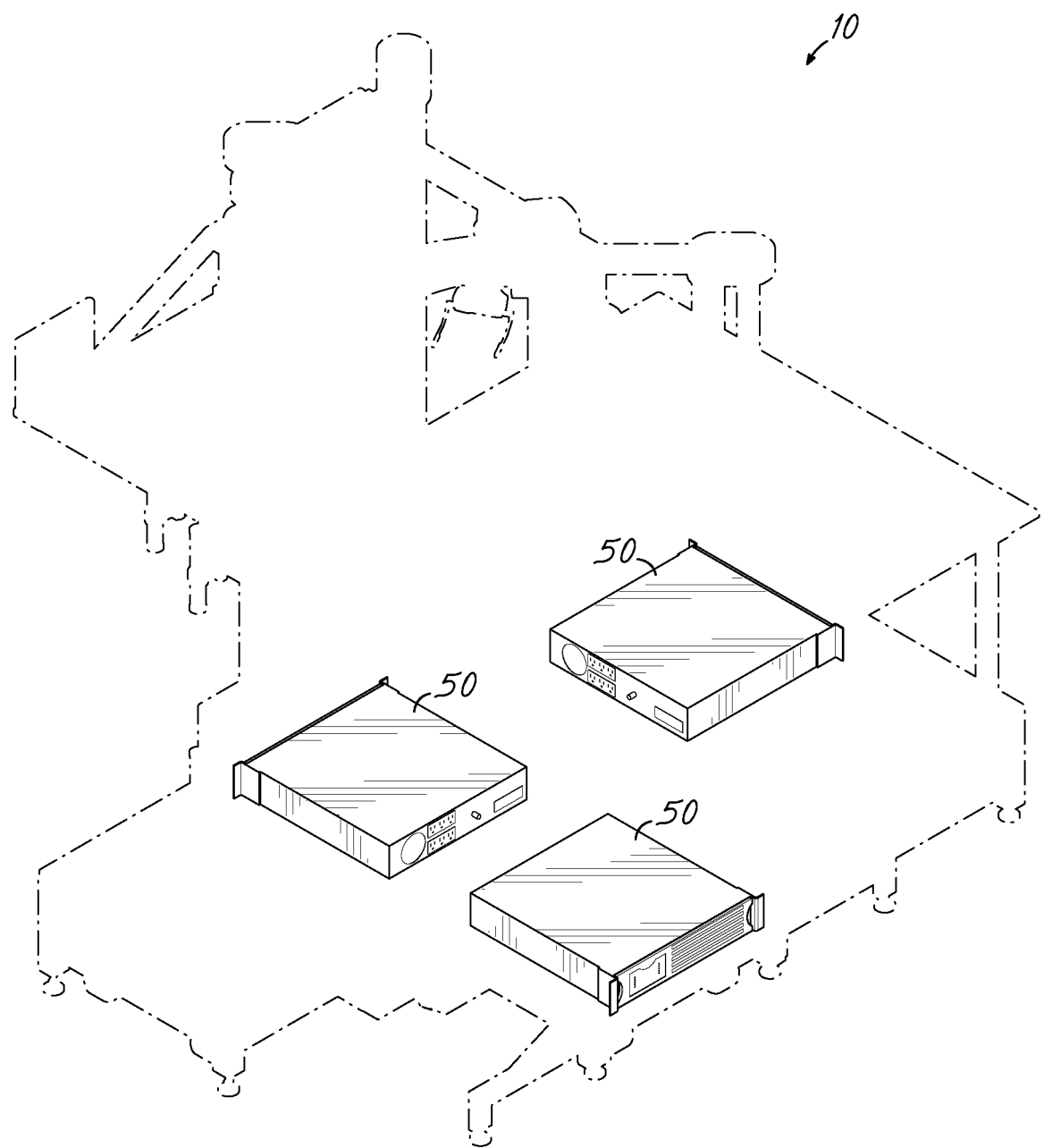
FIG. 2 is a perspective view similar to FIG. 1, showing various components of the automated laboratory system in phantom.

The illustrated automated lab system 10 includes three decks 40, 42, 44 for supporting and/or housing various components of the automated lab system 10. In this regard, each deck 40, 42, 44 includes a deck frame 46 and a plurality of side cover plates 48 defining an at least partially enclosed interior space (not shown) for housing components of the automated lab system 10, such as one or more uninterruptable power supplies 50 (FIG. 2) for providing power to other components of the automated lab system 10, such as the robotic device 14 and/or instruments. In the embodiment shown, the cover plates 48 are perforated for venting the interior space to prevent the uninterruptable power supplies 50 from overheating. The cover plates 48 may be removable in order to provide access to the contents of the interior space. Each of the illustrated decks 40, 42, 44 includes one or more platforms 52 positioned on the corresponding deck frame 46 for supporting various components of the automated lab system 10. In the embodiment shown, the center deck 40 includes outriggers 54 for assisting in stabilizing the deck 40 and components positioned thereon to prevent the deck 40 from tipping over. A plurality of leveling feet 56 are provided at lower ends of each of the deck frames 46 and/or outriggers 54 and are extendable therefrom and retractable thereinto for selectively adjusting the effective heights of the leveling feet 56. A plurality of casters 58 provided at or near lower ends of each of the deck frames 46 may assist in transporting the decks 40, 42, 44 across a surface such as a floor of a laboratory. In one embodiment, any or all of the decks 40, 42, 44 may be coupled together to form a single unit(s). In the embodiment shown, the platforms 52 are each fixed against movement relative to the respective deck frames 46. Alternatively, one or more of the platforms 52 may be movable relative to the respective deck frame(s) 46. For example, one of the platforms 52 may be linearly or rotatably movable relative to the respective deck frame 46.

In the embodiment shown, the vertical shelving system 12 is positioned on the center deck 40. In this regard, the feet 22 and/or lower ends of the posts 18 may be received by and/or coupled to the deck frame 46, such as at or near the corners of the illustrated deck frame 46. The robotic device 14 is also positioned on the center deck 40 in a generally central location relative to the four posts 18 of the frame 16. One or more instruments may be positioned on the left-hand deck 42 and/or on a table 60 on the right-hand deck 44 to elevate the instrument(s) placed thereon to a desired height such as for improved access by the robotic device 14. The illustrated table 60 includes a plurality of table posts 62 terminating at feet 64 in a manner similar to the posts 18 and feet 22 of the vertical shelving system 12. In the embodiment shown, the table 60 is fixed against movement relative to the right-hand deck 44. Alternatively, the table 60 may be movable relative to the respective right-hand deck 44. For example, the table 60 may be linearly or rotatably movable relative to the right-hand deck 44. In other embodiments, the table 60 and/or any of the decks 40, 42, 44 may be eliminated.

In the illustrated embodiment, a total of four shelves 20 are selectively attached to the posts 18 on the side of the frame 16 opposite the table 60, with one shelf 20 selectively attached to one of the left-hand posts 18 (when facing the frame 16 from the side opposite the table 60) and three shelves 20 selectively attached to one of the right-hand posts 18 (when facing the frame 16 from the side opposite the table 60). The number of shelves 20 attached to each of the posts 18 of the frame 16 may be selectively varied to contribute to the modularity of the vertical shelving system 12. In one embodiment, each post 18 may be configured to support a maximum of five shelves 20. In any event, each shelf 20 is attached to the respective post 18 in a cantilevered, articulating manner, as described in greater detail below.

Figure 3:
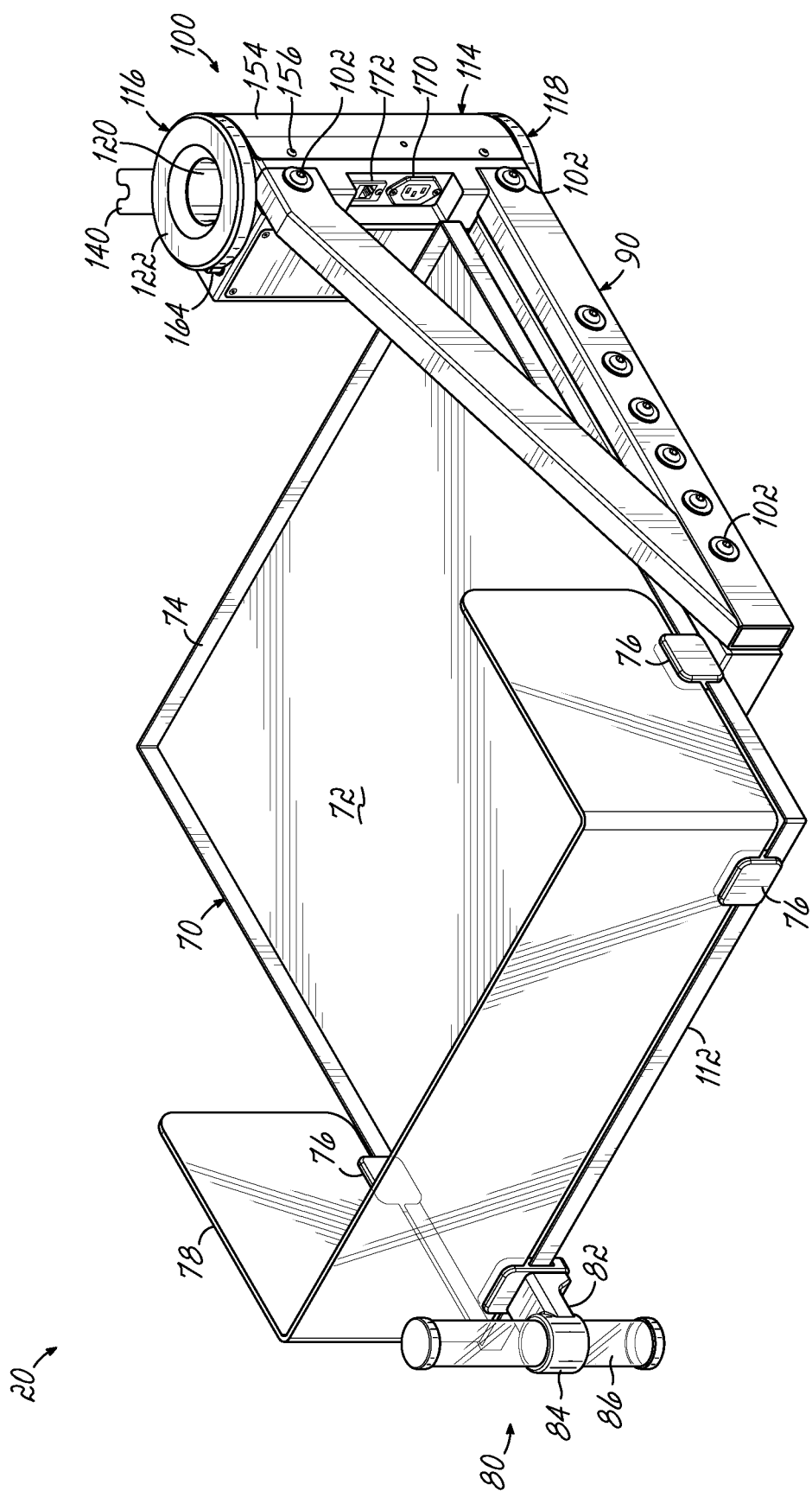
FIG. 3 is a perspective view of a shelf shown in FIG. 1.

Referring now to FIG. 3, and with continuing reference to FIG. 1, each shelf 20 includes a tray 70 for carrying at least one instrument or lab consumable, for example. In this regard, each tray 70 includes a carrying surface 72 for receiving the corresponding instrument and at least one rim 74 extending upwardly from the carrying surface 72 at or near the periphery thereof in order to discourage the instrument carried by the shelf 20 from falling off of the carrying surface 72 and/or to prevent liquids spilled onto the carrying surface 72 from leaking. In addition, or alternatively, the rim 74 may be configured to receive one or more clips 76 for supporting an object such as a shelf guard 78 to provide a barrier at or near the periphery of the shelf 20.

In the embodiment shown, a handle 80 is operatively coupled to the rim 74 via a handle clip 82 having a collar 84 for receiving the handle 80. The handle 80 of each shelf 20 includes a body portion 86 which provides a gripping point for laboratory personnel to manipulate the shelf 20 by exerting a force thereon. In the embodiment shown, the body portion 86 is made of a suitable material, such as glass or plastic, so as to be generally translucent and generally cylindrical in shape, and is coupled to the rim 74 of the tray 70 in a substantially vertical orientation. In other embodiments, the body portion 86 may be configured and/or coupled to the tray 70 in any other suitable manner or orientation. For example, the body portion 86 may be oriented substantially horizontally.

Each shelf 20 includes a shelf frame 90 for providing support to the tray 70 to assist in maintaining the tray 70 substantially level relative to horizontal. As shown, the shelf frame 90 may also operatively couple the tray 70 to a bearing pack 100, which may selectively and/or rotatably secure the shelf 20 to a post 18 of the frame 16. For example, each shelf frame 90 may be coupled to the respective tray 70 and bearing pack 100 by one or more fasteners 102.

Figure 4:
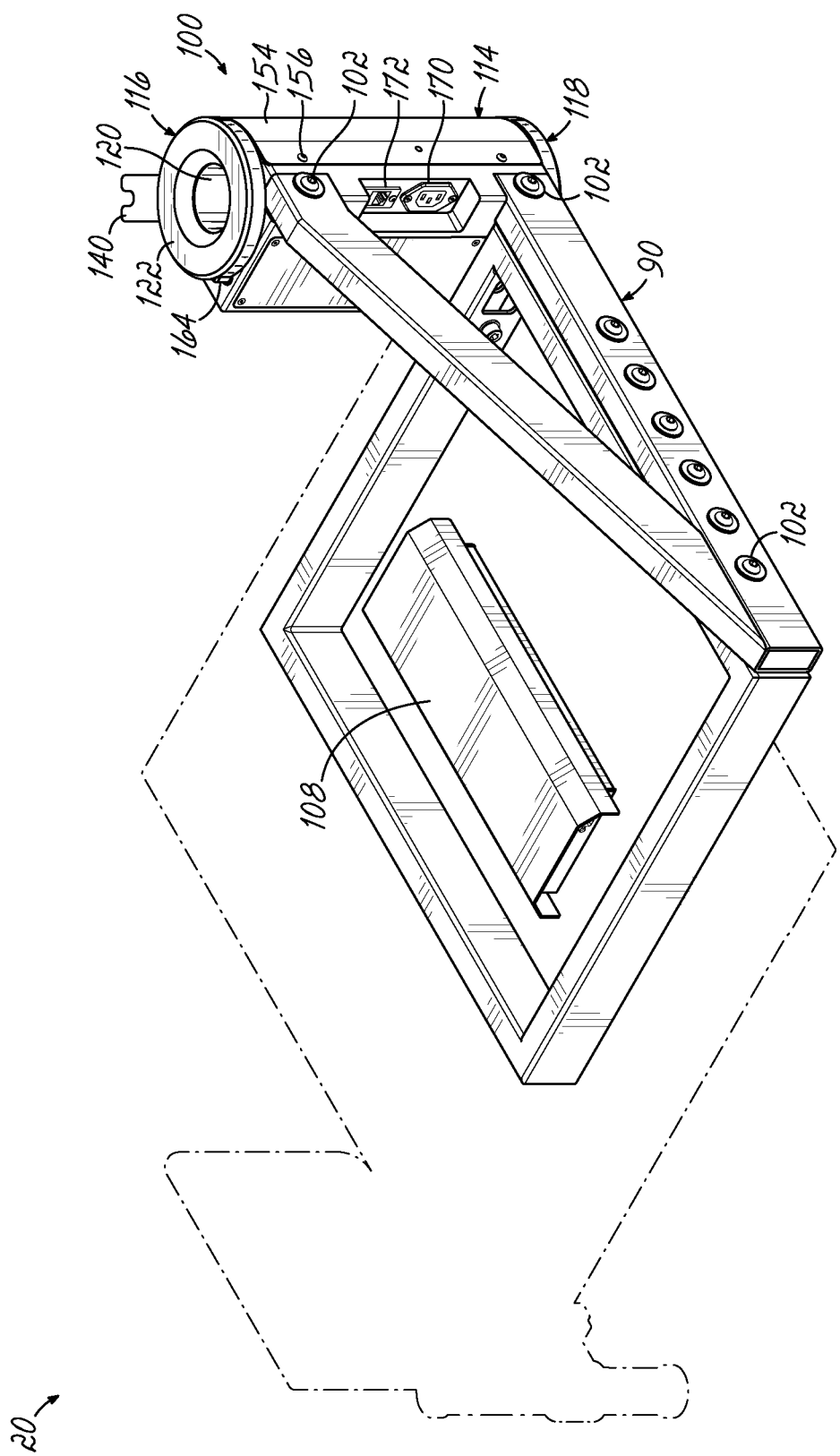
FIG. 4 is a perspective view similar to FIG. 3, showing various components of the shelf in phantom.
Figure 12:
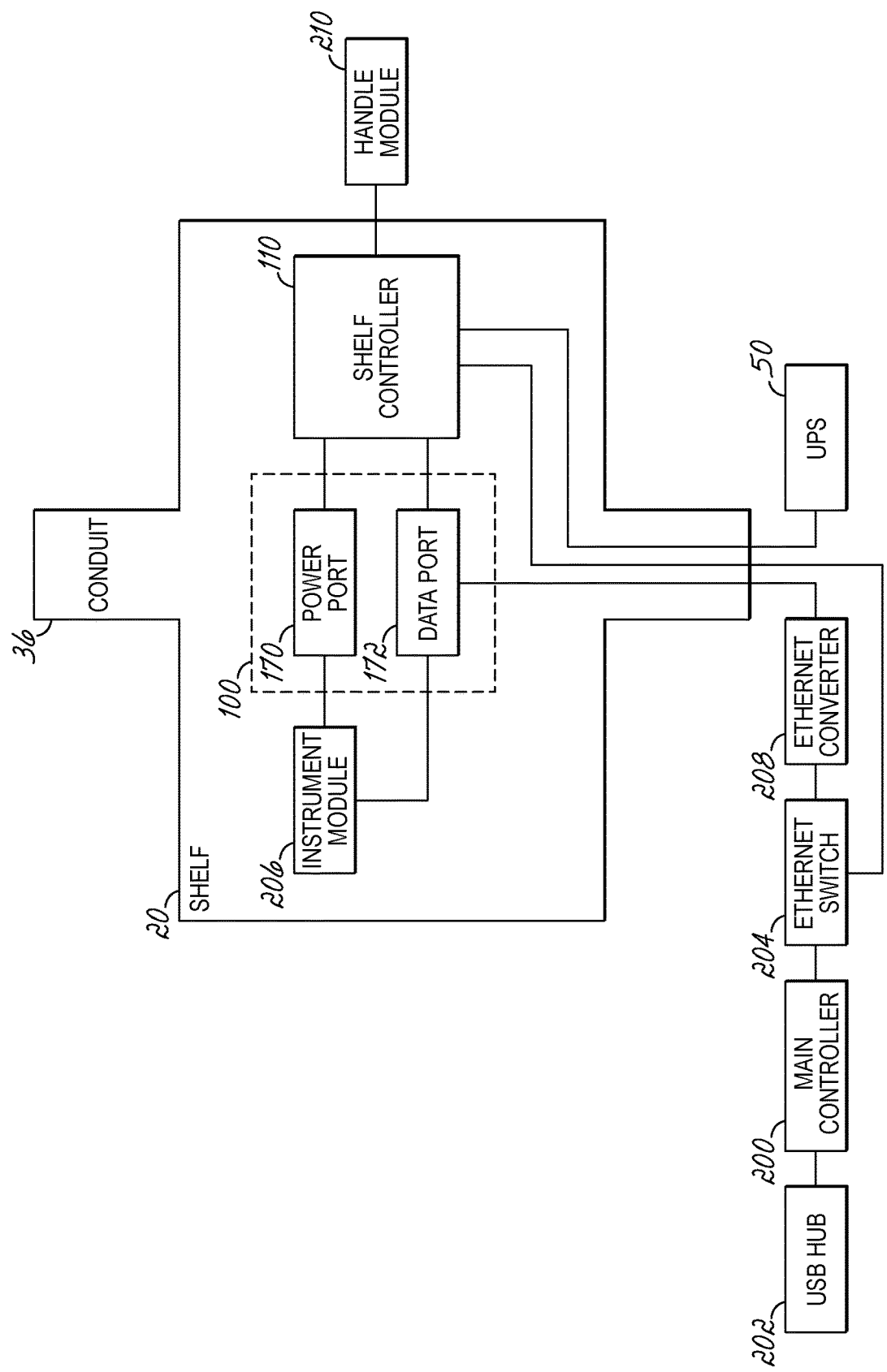
FIG. 12 is a schematic view of an exemplary network for a shelf in accordance with an embodiment of the present invention.

Referring now to FIG. 4, each shelf 20 includes a controller housing 108 for housing a dedicated shelf controller 110 (FIG. 12). In one embodiment, the shelf controller 110 includes a single-board computer having a central processing unit, such as that sold under the trademark Raspberry Pi. In the embodiment shown, the controller housing 108 is mounted to a bottom surface 112 of the tray 70 opposite the carrying surface 72. The features of the shelf controller 110 are discussed in greater detail below.

Figure 5:
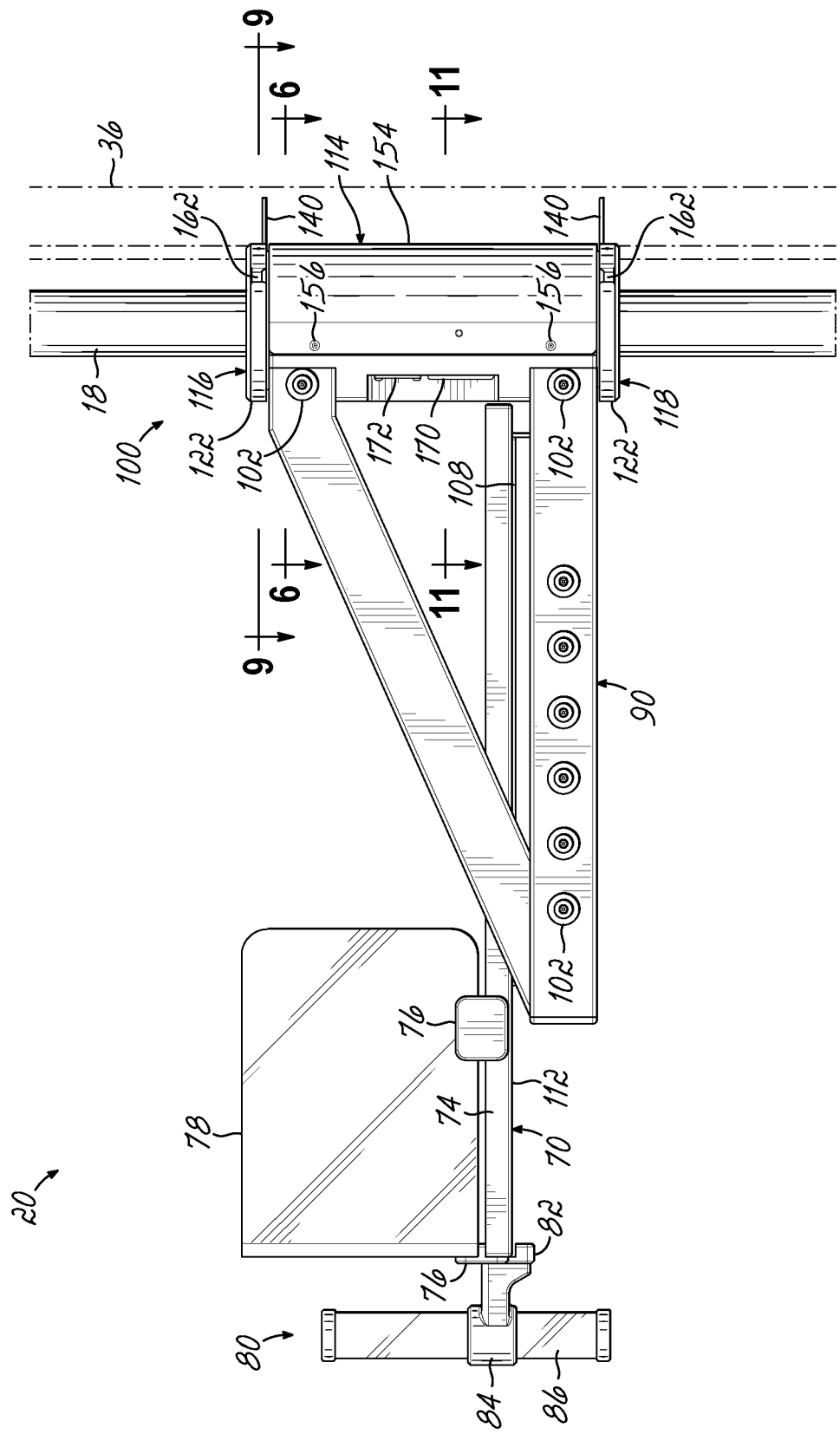
FIG. 5 is a side view of the shelf of FIG. 3.

Each bearing pack 100 is configured to selectively attach to any of the posts 18 at a desired vertical position therealong and to allow the respective shelf 20 to be movable and, more particularly, rotatable relative to the respective post 18. The releasable adjustability of the vertical positioning of the shelves 20 may contribute to the modularity of the vertical shelving system 12. In this regard, each bearing pack 100 includes a rotatable bearing pack body 114 fixedly secured to the tray 70 via the shelf frame 90, and substantially non-rotatable upper and lower caps 116, 118 each having a generally cylindrical sleeve 120 for receiving one of the posts 18 and a flange 122 extending radially outwardly from the sleeve 120 to rotatably sandwich the bearing pack body 114 on the post 18 between the flanges 122 of the upper and lower caps 116, 118 at a desired vertical position, as best shown in FIG. 5.

Figure 6:
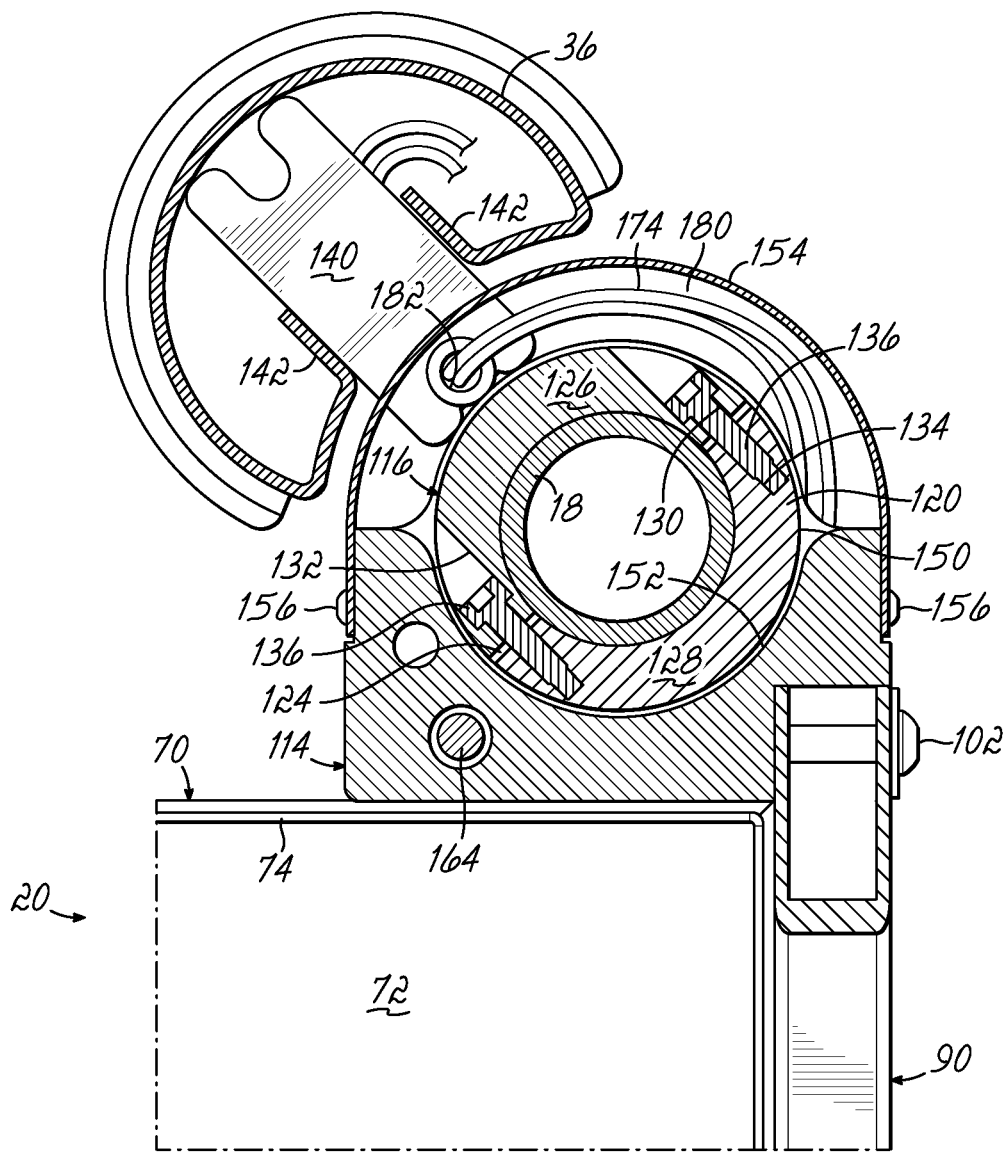
FIG. 6 is a cross sectional view of the shelf of FIG. 5, taken along section line 6-6.

As shown in FIG. 6, at least a portion of the sleeve 120 is bifurcated by a diametrically extending slot 124 into first and second clamping sections 126, 128 which are movable relative to each other in a radial direction. For example, the first and second clamping sections 126, 128 may be moved away from each other thereby increasing the width of the slot 124, such as to provide clearance for fitting the sleeve 120 over an object such as one of the posts 18. Conversely, the first and second clamping sections 126, 128 may be moved toward each other thereby decreasing the width of the slot 124, such as to exert a clamping action for securing the sleeve 120 to an object such as the post 18. In this regard, a pair of bores 130 and corresponding counterbores 132 are provided in the first clamping section 126 and extend transverse to the slot 124, and a pair of threaded bores 134 are provided in the second clamping section 128 and aligned with the bores 134 of the first clamping section 126. A pair of bolts 136 is inserted through the pair of bores 130 and counterbores 132 and threadably engage the threaded bores 134 of the second clamping section 128, such that loosening the bolts 136 from the respective threaded bores 134 may cause the first and second clamping sections 126, 128 to move away from each other and tightening the bolts 136 in the respective threaded bores 134 may cause the first and second clamping sections 126, 128 to move toward each other. With the respective first and second clamping sections 126, 128 moved toward each other sufficiently to exert a clamping action on the post 18, the upper and lower caps 116, 118 may each be secured to one of the posts 18 at desired heights, and the vertical positions of the upper and lower caps 116, 118 may be readily adjusted by moving the respective first and second clamping sections 126, 128 away from each other to allow the caps 116, 118 to slide along the posts 18.

In addition to maintaining the respective cap 116, 118 at the desired height, the clamping action of the first and second clamping sections 126, 128 on the post 18 may be sufficient to fix the respective cap 116, 118 against rotation relative to the corresponding post 18. In the embodiment shown, each of the upper and lower caps 116, 118 includes a radially outwardly extending tab 140. Each tab 140 may be received by the conduit 36 behind the corresponding post 18, and may be in abutment or in near abutment with a pair of opposed flanges 142 extending inwardly on the conduit 36 to limit lateral movement of the tab 140 between the flanges 142. In this manner, the interaction between the tab 140 and the flanges 142 may assist in fixing the respective cap 116, 118 against rotation relative to the corresponding post 18.

While the upper and lower caps 116, 118 of the illustrated embodiment are clamped to the posts 18 via the respective first and second clamping sections 126, 128 and bolts 136, the upper and lower caps 116, 118 may be secured to the posts 18 in any suitable manner.

As shown, the sleeve 120 of each of the upper and lower caps 116, 118 includes an outer bearing surface 150 for allowing the bearing pack body 114 to rotate thereabout. In this regard, the bearing pack body 114 includes at least one inner journal surface 152 configured to confront the outer bearing surface 150 of the sleeve 120 such that the inner journal surface 152 may rotatably slide along the outer bearing surface 150. In this manner, the bearing pack body 114, which is fixedly secured to the tray 70 of the shelf 20, may rotate relative to the upper and lower caps 116, 118, which are secured against rotation relative to the post 18. Consequently, the tray 70 of the shelf 20 may rotate relative to the post 18.

In one embodiment, the shelf 20 may be selectively attached to a desired post 18 at a desired height by first placing the lower cap 118 over the post 18 at the upper end of the post 18 (with the respective end cap 26 removed) such that the sleeve 120 of the lower cap 118 receives the post 18, and advancing the lower cap 118 along the post 18 to a desired vertical position. The bolts 136 of the lower cap 118 may then be tightened such that the first and second clamping sections 126, 128 of the sleeve 120 exert a clamping action on the post 18 to secure the lower cap 118 on the post 18 at the desired vertical position. The bearing pack body 114 may then be placed over the post 18 at the upper end thereof and advanced along the post 18 until the bearing pack body 114 rests against the flange 122 of the lower cap 118, whereat the journal surface 152 of the bearing pack body 114 confronts the bearing surface 150 of the sleeve 120 of the lower cap 118. Subsequently, the upper cap 116 may be placed over the post 18 at the upper end thereof such that the sleeve 120 of the upper cap 116 receives the post 18, and may be advanced along the post 18 until the flange 122 of the upper cap 116 rests against the bearing pack body 114, whereat the journal surface 152 of the bearing pack body 114 confronts the bearing surface 150 of the sleeve 120 of the upper cap 116. The bolts 136 of the upper cap 116 may then be tightened such that the first and second clamping sections 126, 128 of the sleeve 120 exert a clamping action on the post 18 to secure the upper cap 116 on the post 18. With the bolts 136 of the upper and lower caps 116, 118 sufficiently tightened, a cover 154 may be coupled to the bearing pack body 114 via fasteners 156 to conceal the bolts 136. In order to adjust the vertical position of the shelf 20, the cover 154 may be removed to provide access to the bolts 136, of the upper and lower caps 116, 118, which may be loosened sufficiently to allow the upper and lower caps 116, 118 to slide along the post 18 to the desired vertical position. The bolts 136 may then be tightened and the cover 154 replaced.

Thus, the exemplary vertical shelving system 12 may be modular, at least with respect to the number of posts 18, the number of shelves 20 rotatably attached to each of the posts 18, and the vertical positioning of each of the shelves 20 along the respective posts 18.

Figure 7:
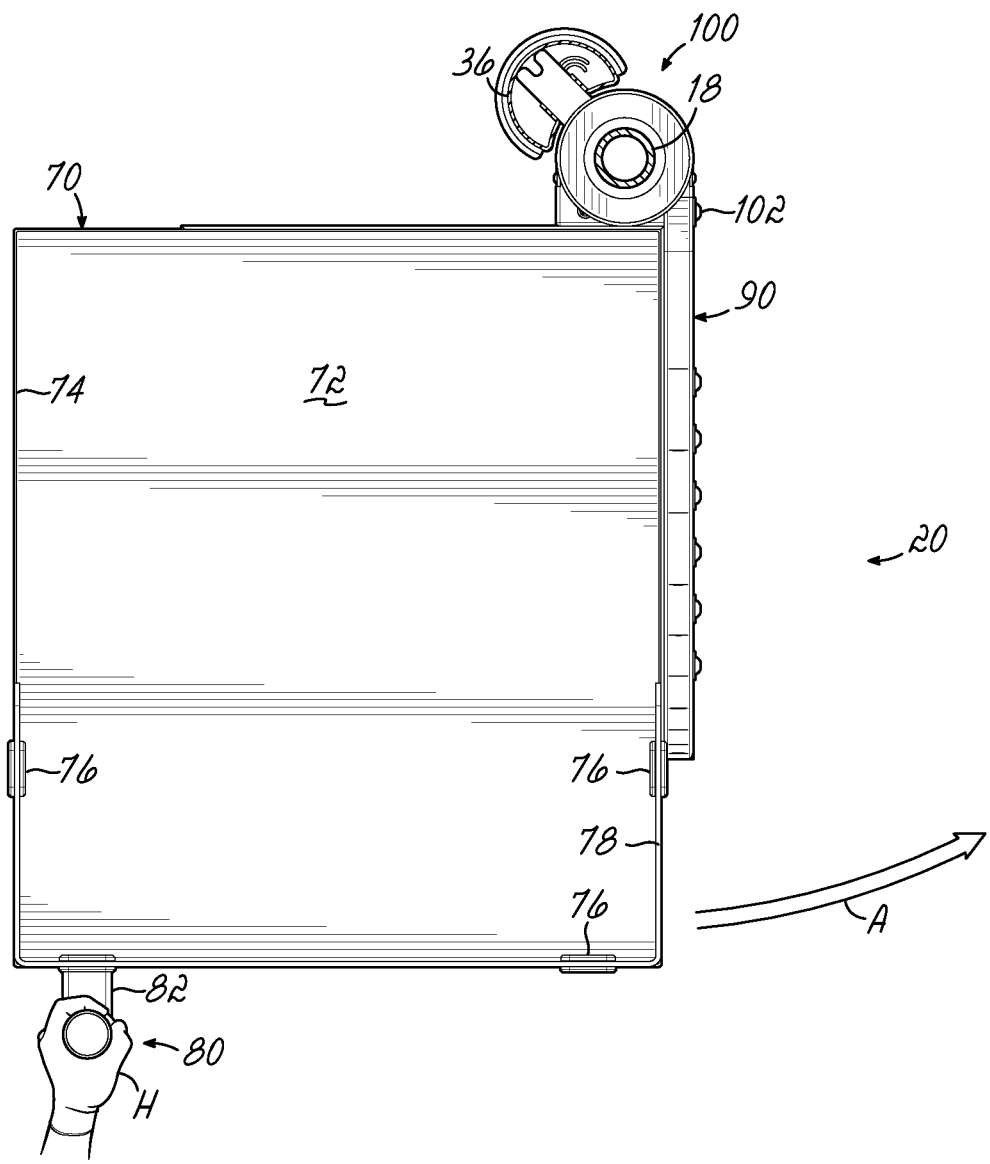
FIG. 7 is a top view of the shelf of FIG. 5, showing the shelf in a docked position.
Figure 8:
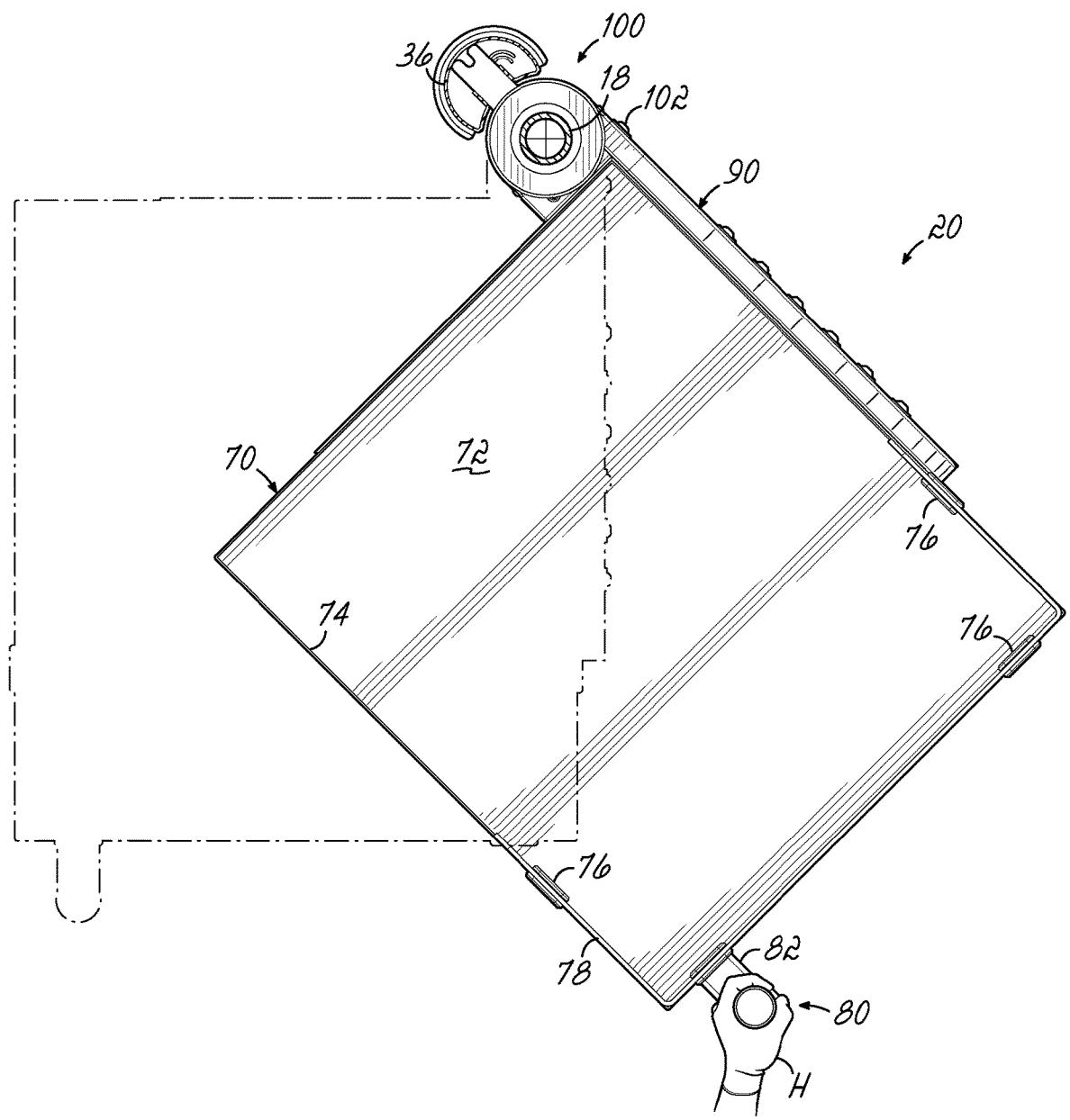
FIG. 8 is a top view similar to FIG. 7, showing the shelf in an undocked position.

As best shown in FIGS. 7 and 8, each shelf 20 is rotatable about the respective post 18 between a docked position (FIG. 7) and at least one undocked position (FIG. 8). Rotation of the shelf 20 between the docked and undocked positions may be achieved by a user U (FIG. 20) gripping and manipulating the handle 80 of the respective shelf 20 via the user's hand H. The illustrated shelf 20 is attached to a right-hand post 18 of the frame 16 (when facing the frame 16 from the position of the shelf 20) and is rotatable from the docked position to the undocked position in a counterclockwise direction, as indicated by the arrow A. Conversely, a shelf 20 attached to a left-hand post 18 of the frame 16 (when facing the frame 16 from the position of the shelf 20) may be rotatable from the docked position to the undocked position in a clockwise direction (not shown). The illustrated undocked position is angularly displaced from the docked position by approximately 45°. The shelf 20 may be rotated to an undocked position having a greater or less angle of displacement from the docked position. The maximum angle of displacement of an undocked position from the docked position may be limited by an external obstacle, such as an adjacent post 18, and/or by an internal stop (not shown). In one embodiment, the undocked position may be angularly displaced from the docked position by approximately 90°.

In any event, when a shelf 20 is in the docked position, the instrument carried by the shelf 20 may be readily accessible by the robotic device 14 for use in an assay, for example, and may be substantially inaccessible to laboratory personnel, such as due to the shelf guard 78 providing a barrier between the laboratory personnel and the instrument. When in the undocked position, the instrument carried by the shelf 20 may be readily accessible by laboratory personnel and the robotic device 14 may be blocked from accessing the instrument, as discussed in greater detail below. Each shelf 20 may be individually undocked as needed for providing laboratory personnel access to the particular instrument carried thereon.

Figure 9:
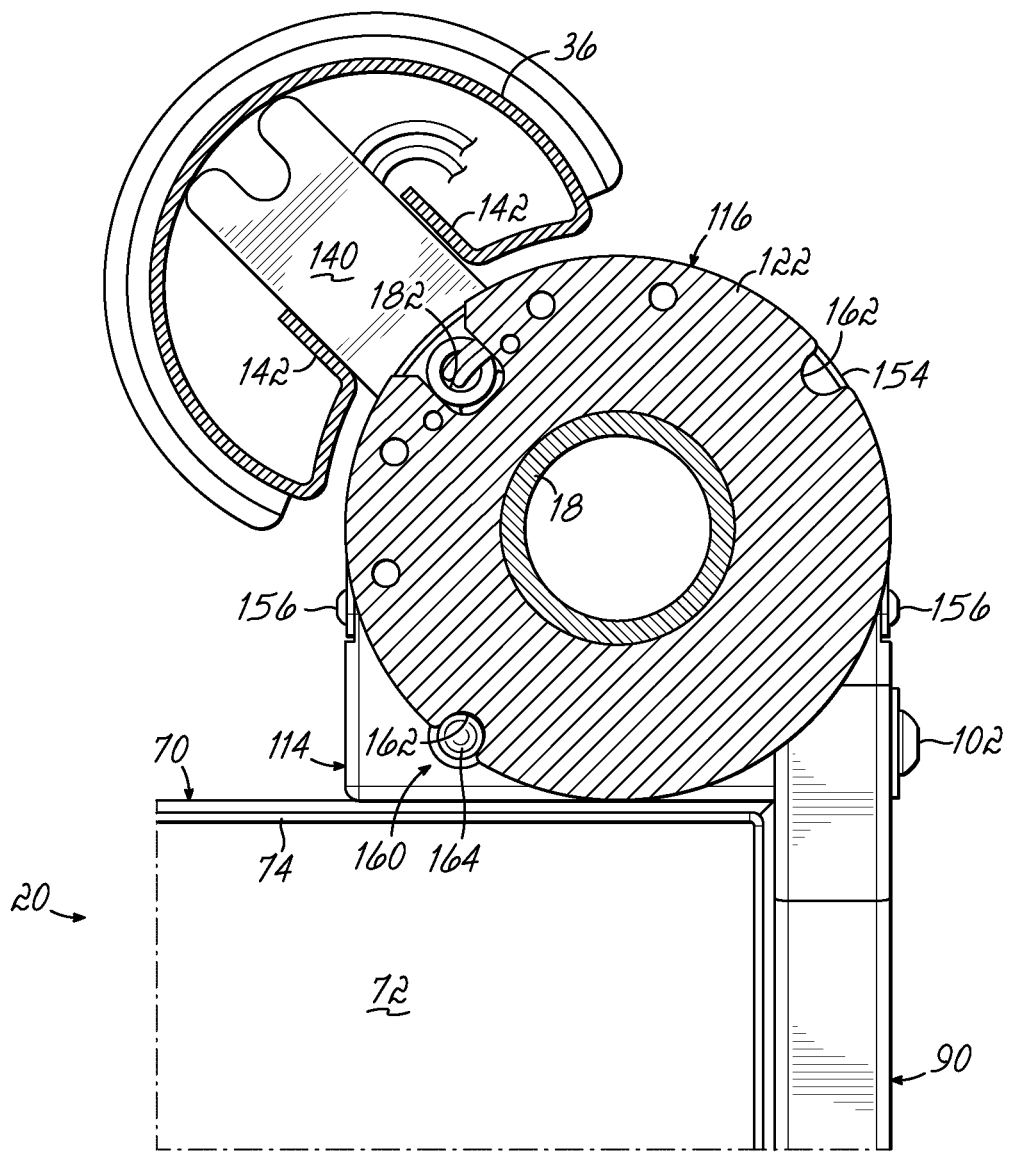
FIG. 9 is a cross sectional view of the shelf of FIG. 5, taken along section line 9-9.

Referring now to FIG. 9, each shelf 20 includes a locking mechanism 160 for selectively locking the shelf 20 against rotation relative to the post 18 when in the docked position. In this regard, the illustrated locking mechanism 160 includes a pair of indents 162 at the periphery of the flange 122 of the upper cap 116 and a pin 164 extendable from and/or retractable into the bearing pack body 114 to engage one of the indents 162 when the shelf 20 is in the docked position. For example, the pin 164 may be coupled to an actuator, such as a linear solenoid (not shown) for selectively extending the pin 164 from and/or retracting the pin 164 into the bearing pack body 114. In one embodiment, the pin 164 may be biased toward one of the extended or retracted positions. For example, the pin 164 may be spring-loaded toward the extended position to urge the pin 164 into engagement with the indent 162 when aligned therewith, in order to automatically lock the shelf 20 when the shelf 20 is rotated into the docked position. In this case, the actuator may be configured to selectively retract the pin 164 by overcoming the spring loading to thereby disengage the pin 164 from the indent 162 and unlock the shelf 20, and thus may be referred to as a lock release.

Figure 10:
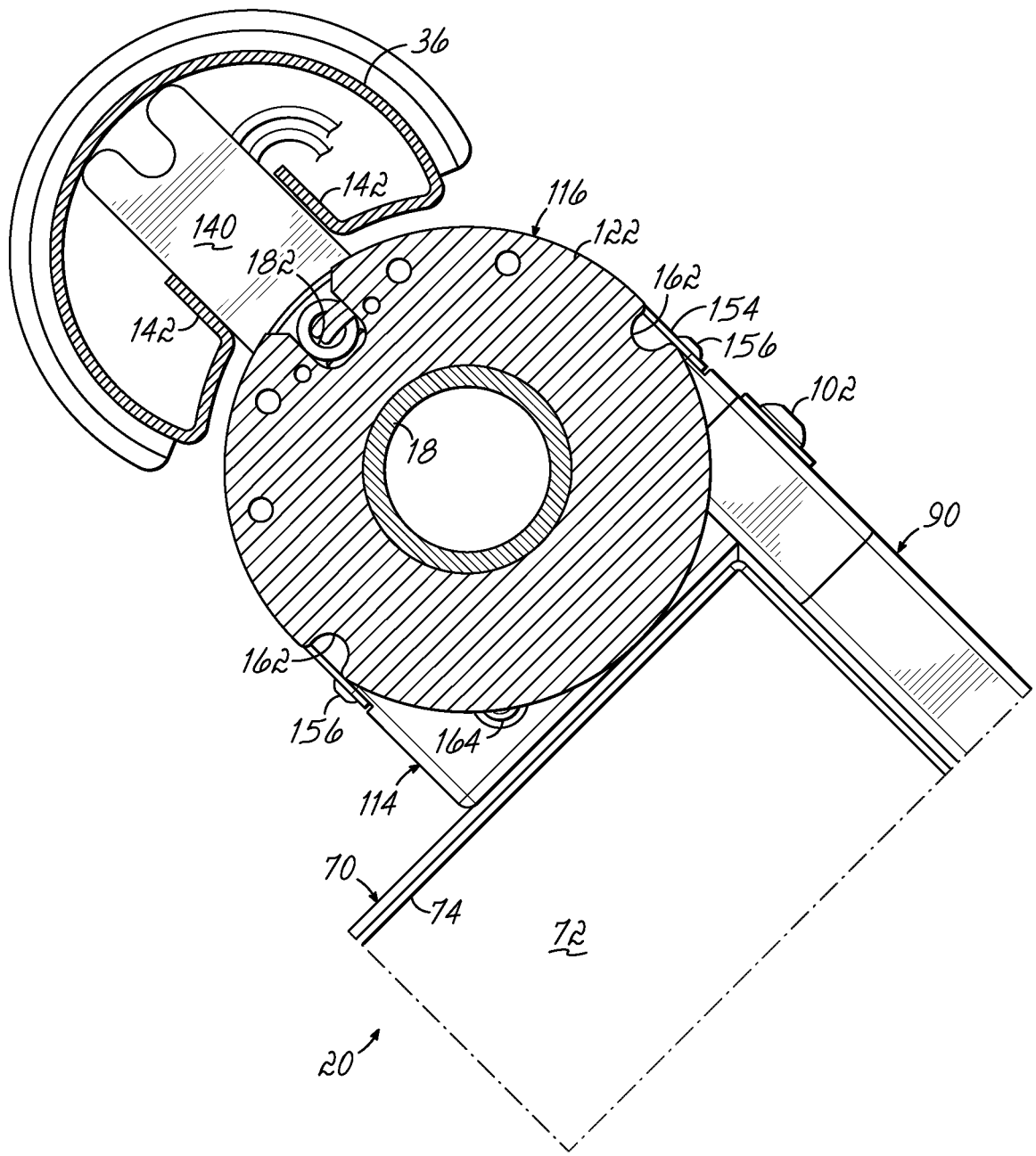
FIG. 10 is a cross sectional view similar to FIG. 9, showing the shelf in an undocked position.

When the pin 164 and indent 162 are engaged, the shelf 20 may be locked against rotation relative to the post 18, such that a user may be unable to rotate the shelf 20 out of the docked position. Thus, the shelf 20 may be both docked and locked. When the pin 164 and indent 162 are disengaged, the shelf 20 may be unlocked and freely rotatable relative to the post 18, such that the shelf 20 may be rotated between the docked and undocked positions. Upon initial retraction of the pin 164, the shelf 20 may be docked and unlocked. When rotated by the user out of the docked position, the shelf 20 may be undocked and unlocked, as shown in FIG. 10. In the embodiment shown, the pair of indents 162 allows the locking mechanism 160 to function when the shelf 20 is positioned on any of the four posts 18 (e.g., regardless of whether the post 18 is on the right-hand or left-hand side of the frame 16). In other embodiments, more or less indents 162 may be provided as may be desired, such as for locking the shelf 20 in an undocked position. Various other configurations of the locking mechanism 160 may be used to selectively lock the shelf 20 against rotation relative to the respective post 18.

Figure 11:
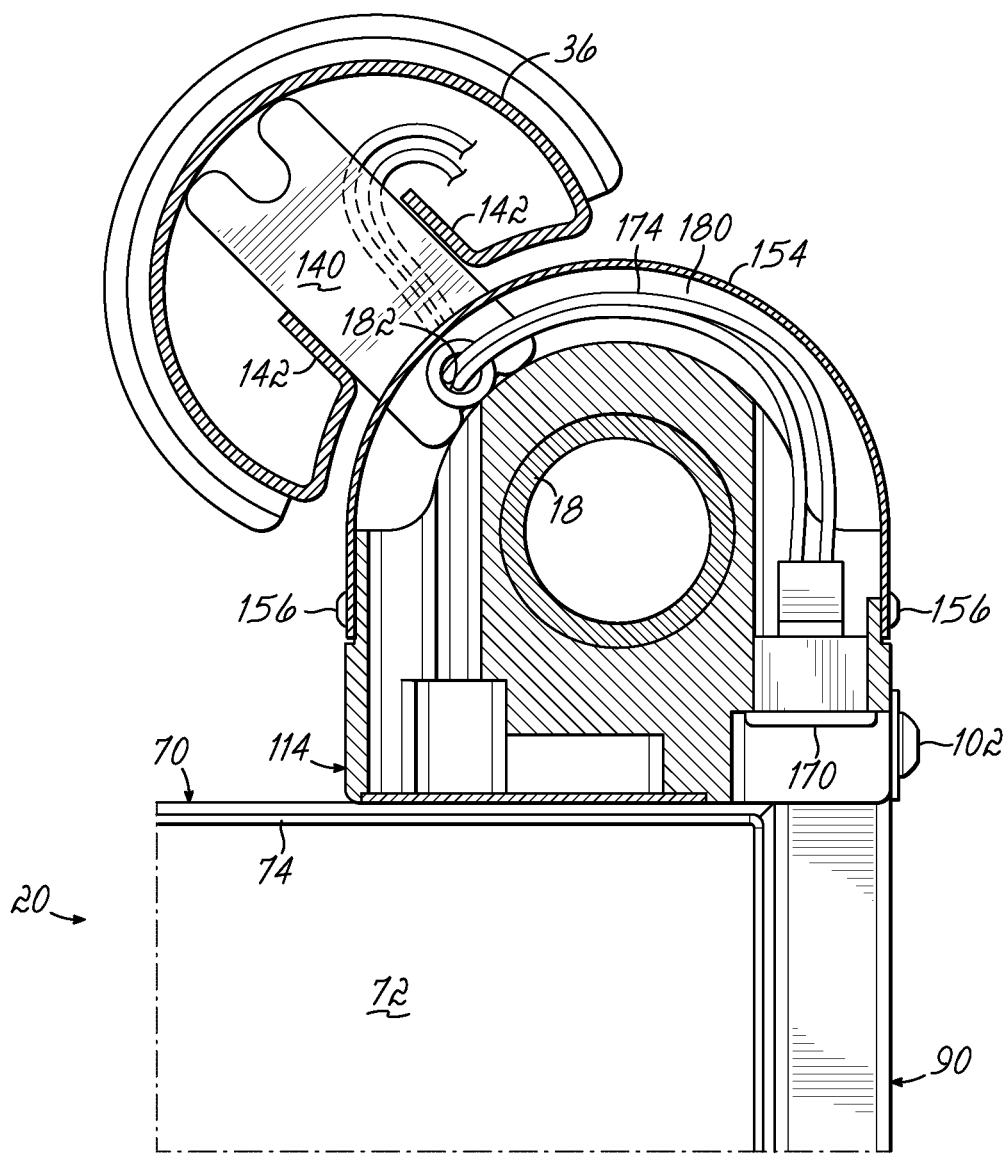
FIG. 11 is a cross sectional view of the shelf of FIG. 5, taken along section line 11-11.

In the embodiment shown, each bearing pack 100 includes at least one power port 170 and at least one data port 172 for receiving respective power and data cables (not shown) from the instrument carried by the shelf 20 on an exterior side of the bearing pack 100. The power port 170 is configured to receive a power cable 174 from the shelf controller 110 on an interior side of the bearing pack 100 such that the instrument may be in electrical communication with the shelf controller 110 to receive power therefrom. In this manner, the power port 170 and power cable 174 may supply electrical power to the instrument, and the shelf controller 110 may be configured to turn the power supply to the instrument on or off. The data port 172 is configured to receive at least one data cable, such as a serial data cable (not shown) on an interior side of the bearing pack 100. As best shown in FIG. 11, a passageway 180 is defined by the bearing pack body 114 and the cover 154 for allowing the cables 174 to pass therethrough to an aperture 182 in the tab 140 to exit the bearing pack 100 into the conduit 36, for example, which may route the cables 174 to their respective destinations. In this manner, the vertical shelving system 12 may provide integrated cable management and each shelf 20 may provide integrated power and communication for the instrument(s) carried thereby.

Referring now to FIG. 12, the automated lab system 10 includes a main controller 200 which may communicate with the shelf controller 110 and/or the instrument carried by the shelf 20 via a USB hub 202, an Ethernet switch 204, and/or any other suitable channel of communication. In the embodiment shown, the main controller 200 communicates with the shelf controller 110 via the Ethernet switch 204, and communicates with an instrument module 206 of the instrument via the Ethernet switch 204, an Ethernet converter 208, and the data port 172. One of the uninterruptable power supplies 50 provides power to the shelf controller 110. As shown, the power and one or more data cables may each be routed to the respective destinations via the conduit 36 behind the post 18 on which the shelf 20 is mounted. For example, the power and data cables may each be routed upwardly from the bottom end of the conduit 36 to their respective destinations. Alternatively, one or more of the power and/or data cables may be routed downwardly from the top end of the conduit 36 to their respective destinations. As shown, the shelf controller 110 may be in communication with a handle module 210, discussed in greater detail below. While not shown, the main controller 200 may be in communication with the robotic device 14 in a known manner, such as through a serial connection. Although communications between the main controller 200, the shelf controllers 110, the instruments, the handle module 210, and/or the robotic device 14 are described as using certain communication protocols, the invention is not so limited. Thus, it should be understood that in alternative embodiments of the invention, communication between the shelf controllers 110, the main controller 200, the instrument modules 206, the handle modules 210, and/or the robotic device 14 may be configured to use any suitable communication protocol including, but not limited to serial, parallel, and/or wireless protocols.

Figure 13:
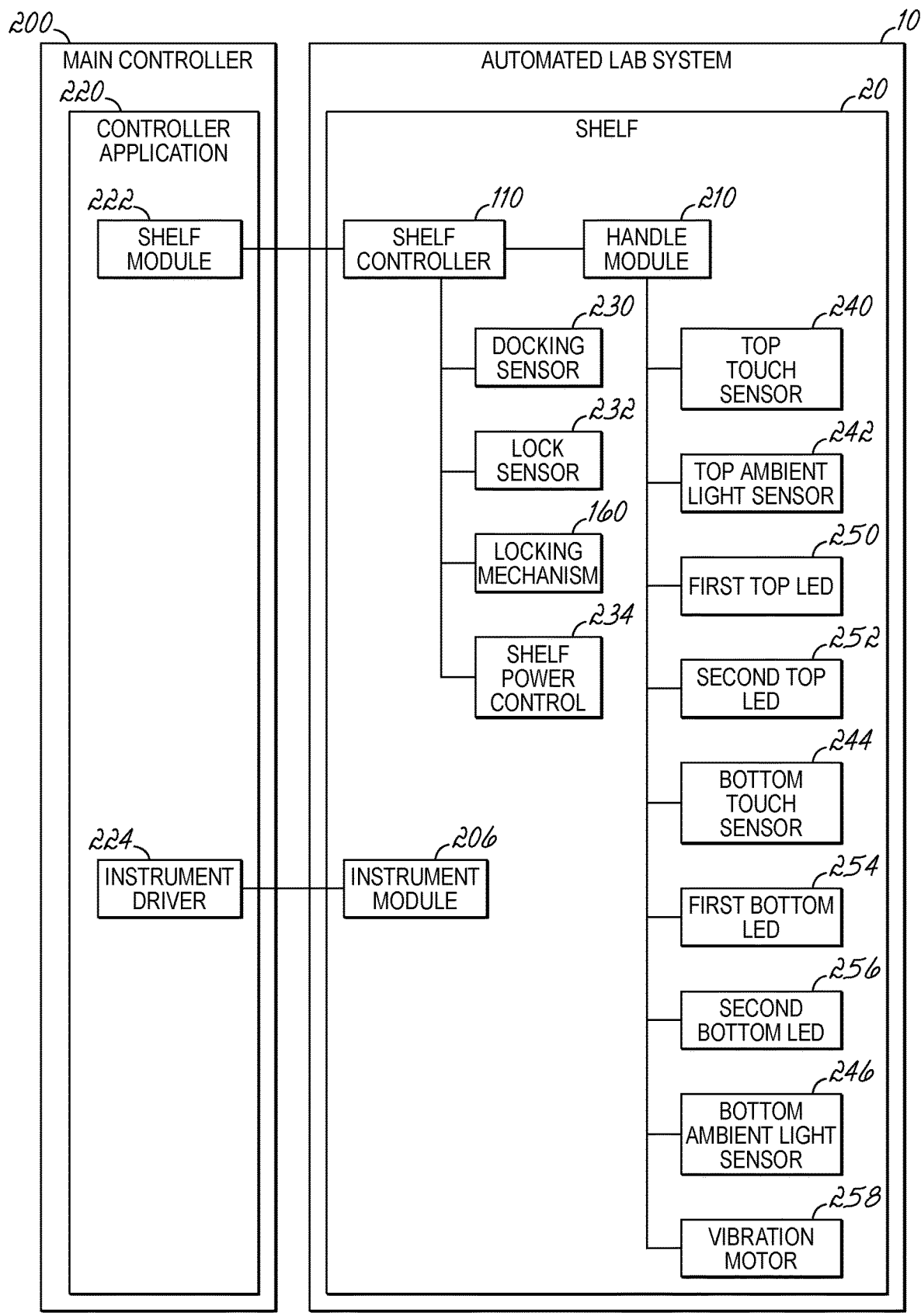
FIG. 13 is a schematic view illustrating communications between the main controller shown in FIG. 12 and other components of the automated lab system.

Referring now to FIG. 13, the exemplary main controller 200 may include a controller application 220 for running a shelf module 222 and at least one instrument driver 224. The shelf module 222 is in communication with the shelf controller 110 for transmitting data therebetween, and the instrument driver 224 is in communication with the instrument module 206 of the instrument carried on the respective shelf 20 for transmitting data therebetween. In the embodiment shown, a single instrument driver 224 is provided. Additional instrument drivers 224 may be provided, such as in cases where a shelf 20 carries more than one instrument.

As shown, each shelf controller 110 is in communication with a docking sensor 230 configured to determine whether the shelf is in the docked position, and is in communication with a lock sensor 232 configured to determine whether the shelf 20 is locked against rotation, such that the sensors 230, 232 may notify the shelf controller 110 of the respective docked and/or locked states of the shelf 20. In the embodiment shown, each shelf controller 110 is also in communication with the locking mechanism 160 and, more particularly, with the actuator of the locking mechanism 160 such that the shelf controller 110 may activate and/or deactivate the actuator or lock release in order to lock and/or unlock the shelf 20. In the embodiment shown, each shelf controller 110 is further in communication with a shelf power controller 234 for switching the power supply to the shelf 20 on or off.

Each handle module 210 includes at least one sensor for detecting contact or proximity between the body portion 86 of the handle 80 and an object such as a user's hand H. In the exemplary embodiment, each handle module 210 includes a top touch sensor 240 and a top ambient light sensor 242 which may be positioned in an upper section of the body portion 86, and a bottom touch sensor 244 and a bottom ambient light sensor 246 which may be positioned in a lower section of the body portion 86. Each of the top and bottom touch sensors 240, 244 may be infrared proximity sensors configured to detect a change in infrared radiation resulting from a user's hand H being positioned around or removed from the body portion 86 of the handle 80. In other embodiments, the handle module 210 may include additional touch sensors 240, 244 or fewer touch sensors 240, 244 of various suitable types for detecting contact with or proximity to a user's hand H, as may be desired. For example, optical sensors and/or capacitive sensors may be used. As discussed in greater detail below, the touch sensors 240, 244 may receive input from the user to request to unlock the respective shelf 20, and may receive input from the user indicating whether to wait until the instrument carried by the shelf 20 is not being used by automation or to unlock the shelf 20 while being used by automation. The proximity of the handle 80 to the instrument carried by the respective shelf 20 may assist the user in providing input to the proper handle 80 associated with the target instrument of the automated lab system 10.

As shown, each handle module 210 also includes at least one indicator for providing a discernible indication to a user. More particularly, each handle module 210 includes one or more light sources such as first and second top light emitting diodes (LEDs) 250, 252 which may be positioned in an upper section of the body portion 86, and first and second bottom LEDs 254, 256 which may be positioned in a lower section of the body portion 86. Each of the LEDs 250, 252, 254, 256 may be configured to provide a visual indication to a user. In one embodiment, each of the LEDs 250, 252, 254, 256 may be independently controllable and/or may be multi-colored so as to be capable of emitting multiple colors of light to provide a variety of visual indications. The ambient light sensors 242, 246 may be optical sensors configured to regulate the intensity of the LEDs 250, 252, 254, 256 in order to provide sufficient and consistent contrast of the lighting of the handle 80 relative to the ambient light levels. In the illustrated embodiment, each handle module 210 further includes a vibration source such as a vibration motor 258 configured to provide a tactile indication to the user. As discussed in greater detail below, the LEDs 250, 252, 254, 256 may indicate whether the instrument carried by the respective shelf 20 can be used by the user, whether the instrument is needed for automation, or whether the instrument is in an error state. The vibration motor 258 may provide tactile feedback to the user indicating that the user has held the handle module 210, such as the body portion 86 thereof, for a sufficient duration of time to initiate a request or demand for the instrument carried by the respective shelf 20 to be taken offline, as discussed in greater detail below. The proximity of the handle 80 to the instrument carried by the respective shelf 20 may assist the user in recognizing the particular instrument of the automated lab system 10 that is the subject of the provided indication.

Figure 14:
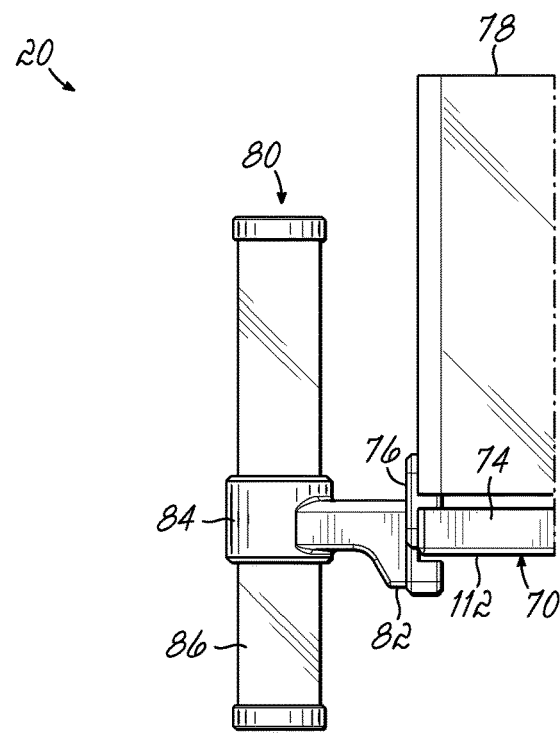
FIG. 14 is a side view of the handle of FIG. 3, showing the handle in an unilluminated state.
Figure 15:
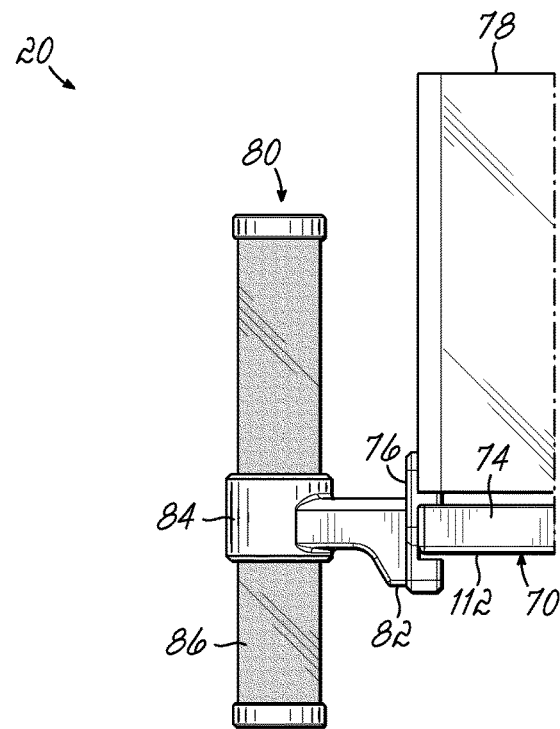
FIG. 15 is a side view similar to FIG. 14, showing the handle in an illuminated state.
Figure 16:
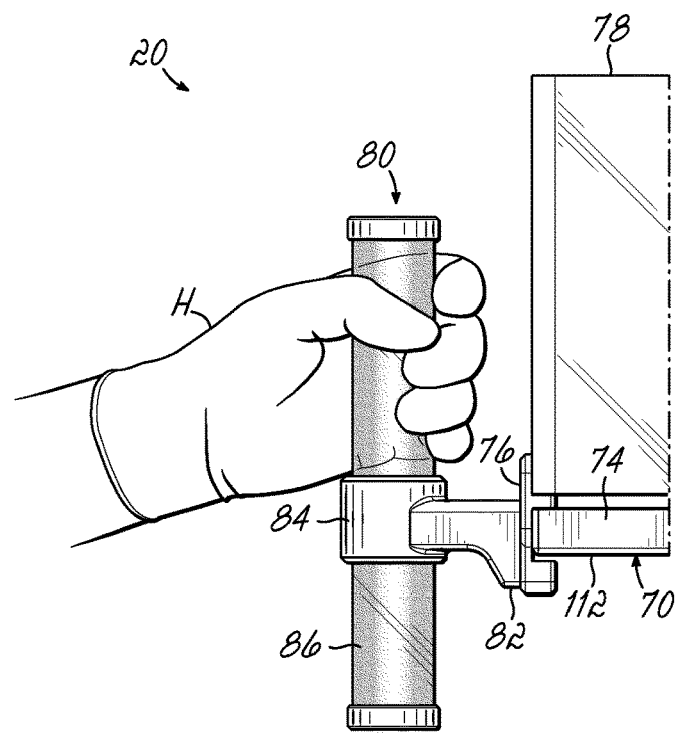
FIG. 16 is a side view similar to FIG. 14, showing the handle in a flashing state.
Figure 17:
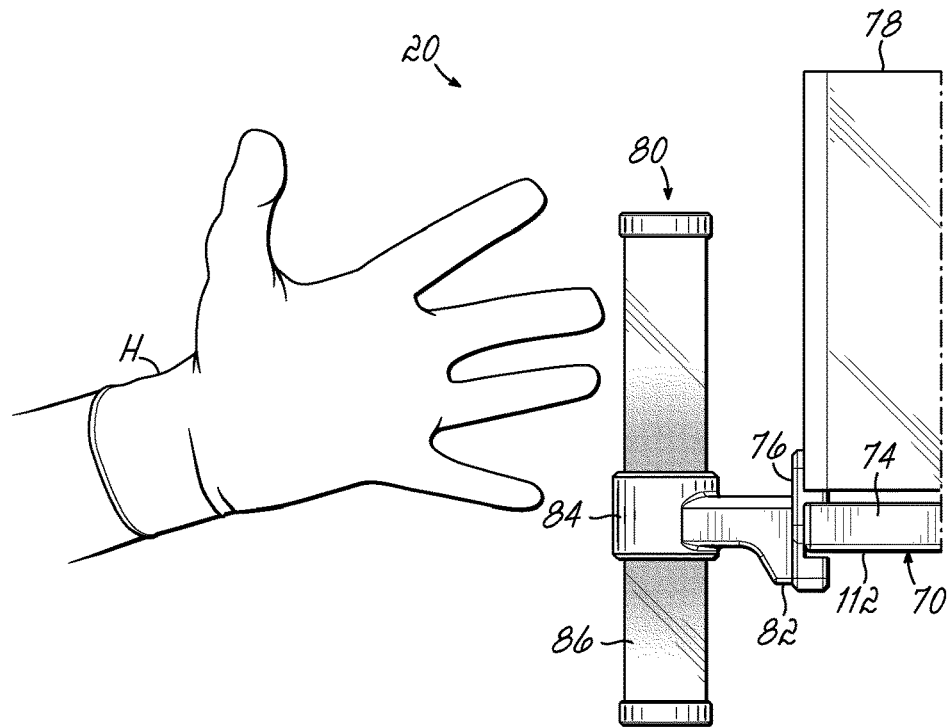
FIG. 17 is a side view similar to FIG. 14, showing the handle in a breathing or gently pulsating state.

Referring now to FIGS. 14-17, the LEDs 250, 252, 254, 256 of the handle 80 may be dormant when the instrument carried on the respective shelf 20 is not powered, such that the handle 80 is not illuminated (FIG. 14). When powered on, the LEDs 250, 252, 254, 256 may be activated in response to a signal(s) received from the respective shelf controller 110 by the handle module 210, such that the handle 80 is illuminated (FIG. 15). The handle 80 may be illuminated in a variety of manners to indicate a variety of states of the shelf 20 and/or instrument carried by the shelf 20. For example, the handle 80 may be illuminated white to indicate that the instrument is powered but not yet in communication with the main controller 200. The handle 80 may be illuminated blue to indicate that the instrument is in communication with the main controller 200 and ready for automation ("online"). The handle 80 may be illuminated green to indicate that the shelf 20 is ready for unlocking and/or the instrument is ready for access by a user ("offline"). The handle 80 may be illuminated yellow to indicate a warning state of the instrument and may be illuminated red to indicate an error state of the instrument. The handle 80 may be illuminated in a flashing manner when gripped by a user's hand H to acknowledge the user's input and/or to indicate that the instrument is transitioning between states (FIG. 16) and may be illuminated in a breathing or gently pulsating manner to indicate that the instrument is ready for user handling (FIG. 17). It will be appreciated that the invention is not limited to these exemplary indications. In other embodiments, the various indications provided by the handle 80 may be configured in any suitable manner. For example, a variety of dynamic effects, such as changes in illumination colors, illumination patterns and/or vibrations, may be provided by the LEDs 250, 252, 254, 256 and/or vibration motor 258 to indicate a variety of statuses and/or transitions between statuses of various components of the automated lab system 10.

In one embodiment, the handle module 210 may be configured to send an offline request to the main controller 200, such as via the shelf controller 110, that the instrument carried by the respective shelf 20 be taken offline. This may be done in preparation for unlocking the shelf 20. For example, the request may be triggered by one or more of the touch sensors 240, 244 of the handle 80 detecting a relatively short hold of the handle 80 by the user's hand H.

In addition, or alternatively, the handle module 210 may be configured to send a request cancellation to the main controller 200, such as via the shelf controller 110, cancelling a request to take the instrument carried by the shelf 20 offline. For example, the request cancellation may be triggered by one or more of the touch sensors 240, 244 of the handle 80 detecting a subsequent contact or proximity between the handle 80 and the user's hand H following the short hold.

In addition, or alternatively, the handle module 210 may be configured to send an immediate unlock request to the shelf controller 110 that the locking mechanism 160 be immediately disengaged so that the shelf 20 may swing out from the docked position to the undocked position. For example, the immediate unlock request may be triggered by one or more of the touch sensors 240, 244 of the handle 80 detecting a relatively long hold of the handle 80 by the user's hand H. The handle module 210 may be configured to acknowledge the relatively long hold of the handle 80 by activating the vibration motor 258 to provide tactile feedback to the user's hand H. The shelf controller 110 may, in turn, send an offline request to the main controller 200 that the instrument carried by the shelf 20 be taken offline.

Various exemplary methods of using the handle 80 to interact with the automated lab system 10 will now be described.

Figure 18:
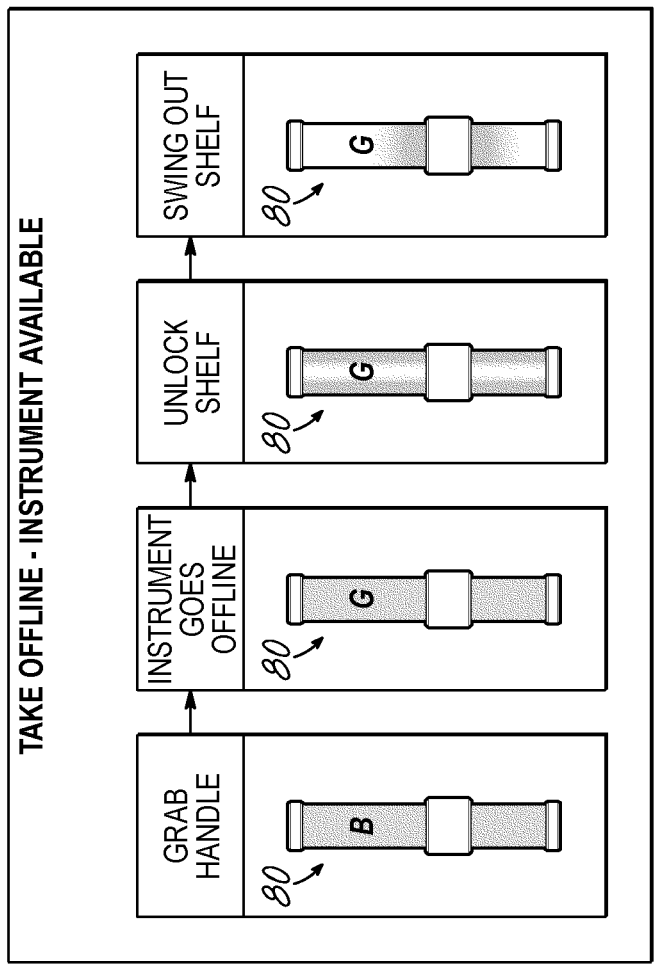
FIG. 18 is a schematic diagram of a method of using the handle to take an instrument offline when the instrument is available.

A method of taking the instrument carried by a shelf 20 offline when the instrument is available is shown schematically in FIG. 18. The handle 80 is initially illuminated blue by the LEDs 250, 252, 254, 256 to indicate that the instrument is online and ready for automation. The user then grips the handle 80. In response to the user gripping the handle 80, the instrument is taken offline. At this time, the handle 80 is illuminated green to indicate that the instrument is offline. The shelf 20 is then unlocked. At this time, the handle 80 is illuminated green in a flashing manner to indicate that the shelf 20 is unlocked. With the shelf 20 unlocked, the user may swing the shelf 20 out to the undocked position to access the instrument. At this time, the handle 80 is illuminated green in a breathing or gently pulsating manner to indicate that the instrument is ready for user handling.

Figure 19:
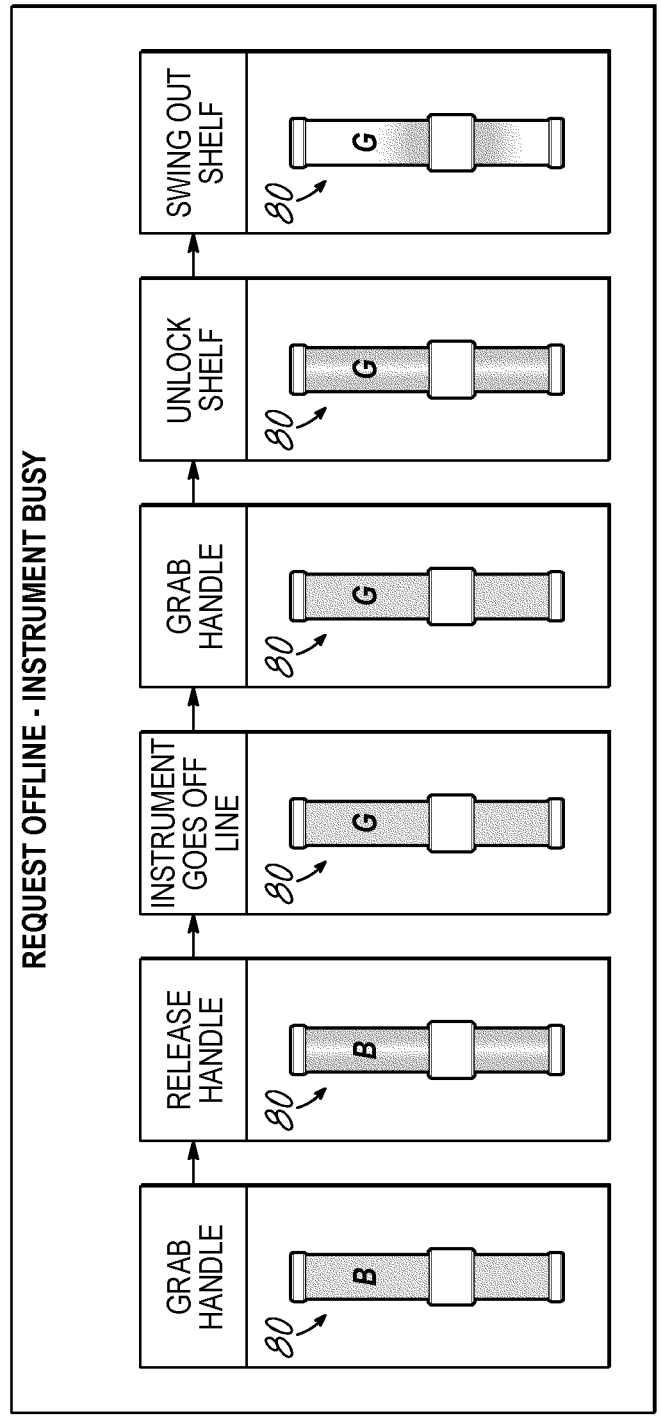
FIG. 19 is a schematic diagram of a method of using the handle to request that an instrument be taken offline when the instrument is busy.

A method of requesting the instrument carried by a shelf 20 to be taken offline when the instrument is busy is shown schematically in FIG. 19. The handle 80 is initially illuminated blue by the LEDs 250, 252, 254, 256 to indicate that the instrument is online and ready for automation. The user then grips the handle 80. In response to the user gripping the handle 80, the handle 80 is illuminated blue in a flashing manner. At this time, the user may release the handle 80. In response to the user gripping and releasing the handle 80, or applying a "short hold" to the handle 80, the instrument is taken offline when the instrument becomes available. At this time, the handle 80 is illuminated green to indicate that the instrument is offline. The user again grips the handle 80 while the handle 80 is illuminated green. The shelf 20 is then unlocked. At this time, the handle 80 is illuminated green in a flashing manner to indicate that the shelf 20 is unlocked. With the shelf 20 unlocked, the user may swing the shelf 20 out to the undocked position to access the instrument. At this time, the handle 80 is illuminated green in a breathing or gently pulsating manner to indicate that the instrument is ready for user handling.

Figure 20:
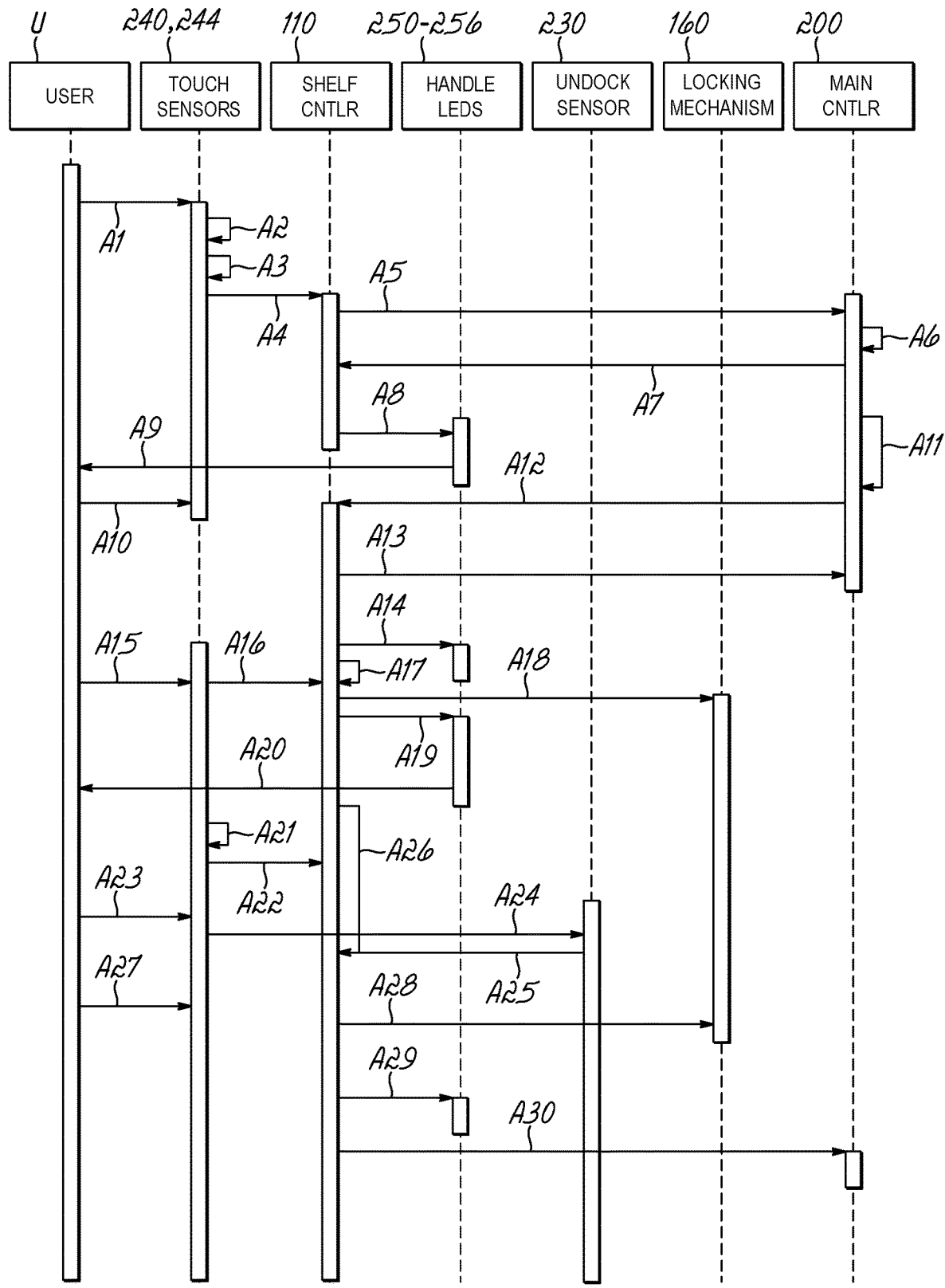
FIG. 20 is a sequence diagram showing the flow of communication between various components of the automated lab system during the method shown in FIG. 19.

Operation of the automated laboratory system 10 is illustrated in greater detail in FIG. 20, which depicts a sequence diagram showing the exemplary steps without implying the direction of communication. Initially, the shelf 20 is docked and locked, the instrument carried on the shelf 20 is online and busy, and the user U desires to undock the shelf 20. At the conclusion of the method, the shelf 20 is undocked, the instrument carried on the shelf 20 is offline, and the robotic device 14 is blocked from accessing the shelf 20.

In response to the user U gripping A1 the handle 80, the touch is detected A2 by one or more of the touch sensors 240, 244. In response to one or more of the touch sensors 240, 244 detecting a short hold A3, the short hold trigger A4 is communicated by the touch sensors 240, 244 to the shelf controller 110. In response to receiving the short hold trigger, the shelf controller 110 sends a request A5 to the main controller 200 to unlock, while the instrument carried on the shelf 20 is busy. In response to receiving the request A5, the main controller 200 blocks A6 the robotic device 14 from accessing the shelf 20. The main controller 200 then communicates a notification A7 of the success to the shelf controller 110. In response to receiving the notification A7, the shelf controller 110 commands A8 the handle LEDs 250, 252, 254, 256 to indicate that the shelf 20 is pending unlock. In response to receiving the command A8, the LEDs 250, 252, 254, 256 provide a visual indication A9 to the user U that unlock is pending. The user U may then release A10 the handle 80, which may occur at any time after the short hold has been detected. The main controller 200 waits A11 for the instrument carried on the shelf 20 to become idle before communicating A12 to the shelf controller 110 that the shelf 20 is safe to unlock. The shelf controller 110 communicates A13 the success to the main controller 200. The shelf controller 110 commands A14 the handle LEDs 250, 252, 254, 256 to indicate that the shelf 20 is ready to unlock. The user U may then grip A15 the handle 80, thereby causing the touch sensors 240, 244 to communicate A16 the touch trigger to the shelf controller 110. The shelf controller 110 may then wait A17 until the touch is detected. In response to detecting the touch, the shelf controller 110 commands A18 the locking mechanism 160 to engage the lock release. The shelf controller 110 may then command A19 the handle LEDs 250, 252, 254, 256 to indicate that the shelf 20 is unlocked. In response, the LEDs 250, 252, 254, 256 may provide a visual indication A20 to the user U that the shelf 20 can be moved out of the docked position.

In response to the touch sensors 240, 244 detecting a short hold A21, the touch sensors 240, 244 may communicate A22 the short hold trigger to the shelf controller 110, which will ignore the short hold in this case. In response to the user U pulling A23 the handle 80, the undock sensor 230 may detect A24 undocking of the shelf 20. The undock sensor 230 may then communicate A25 to the shelf controller 110 that the shelf 20 is undocked. The shelf controller 110 waits A26 for the undock sensor 230 to communicate that the shelf 20 is undocked. In response to the user U releasing A27 the handle 80, the shelf controller 110 commands A28 the locking mechanism 160 to disengage the lock release. The shelf controller 110 may then command A29 the handle LEDs 250, 252, 254, 256 to indicate that the shelf 20 is undocked. The shelf controller 110 may then communicate A30 to the main controller 200 that the shelf 20 is undocked.

Figure 21:
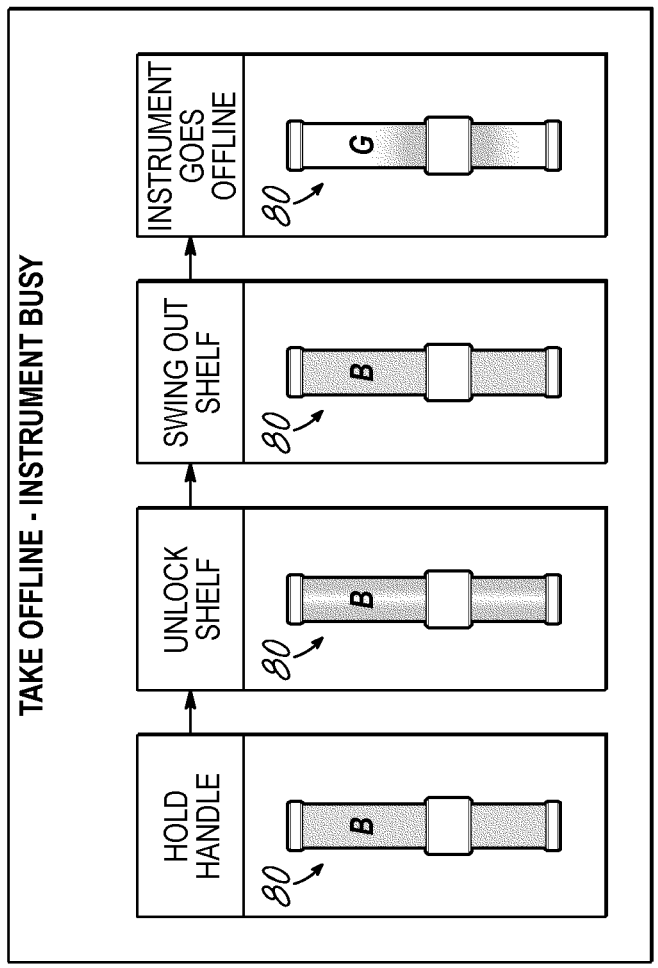
FIG. 21 is a schematic diagram of a method of using the handle to take an instrument offline when the instrument is busy.

A method of taking the instrument carried by a shelf 20 offline when the instrument is busy is shown schematically in FIG. 21. The handle 80 is initially illuminated blue by the LEDs 250, 252, 254, 256 to indicate that the instrument is online and ready for automation. The user U then grips and holds the handle 80. In response to the user U continuing to hold the handle 80, or applying a "long hold" to the handle 80, the handle 80 may vibrate via the vibration motor 258 to indicate that the handle 80 has been held long enough to make a demand to undock, and the shelf 20 is unlocked. At this time, the handle 80 is illuminated blue in a flashing manner to indicate that the shelf 20 is unlocked. With the shelf 20 unlocked, the user U may swing the shelf 20 out to the undocked position to access the instrument. At this time, the handle 80 is illuminated blue to indicate that the instrument is still online. Eventually, the device goes offline. At this time, the handle 80 is illuminated green in a breathing or gently pulsating manner to indicate that the instrument is ready for user handling.

Figure 22:
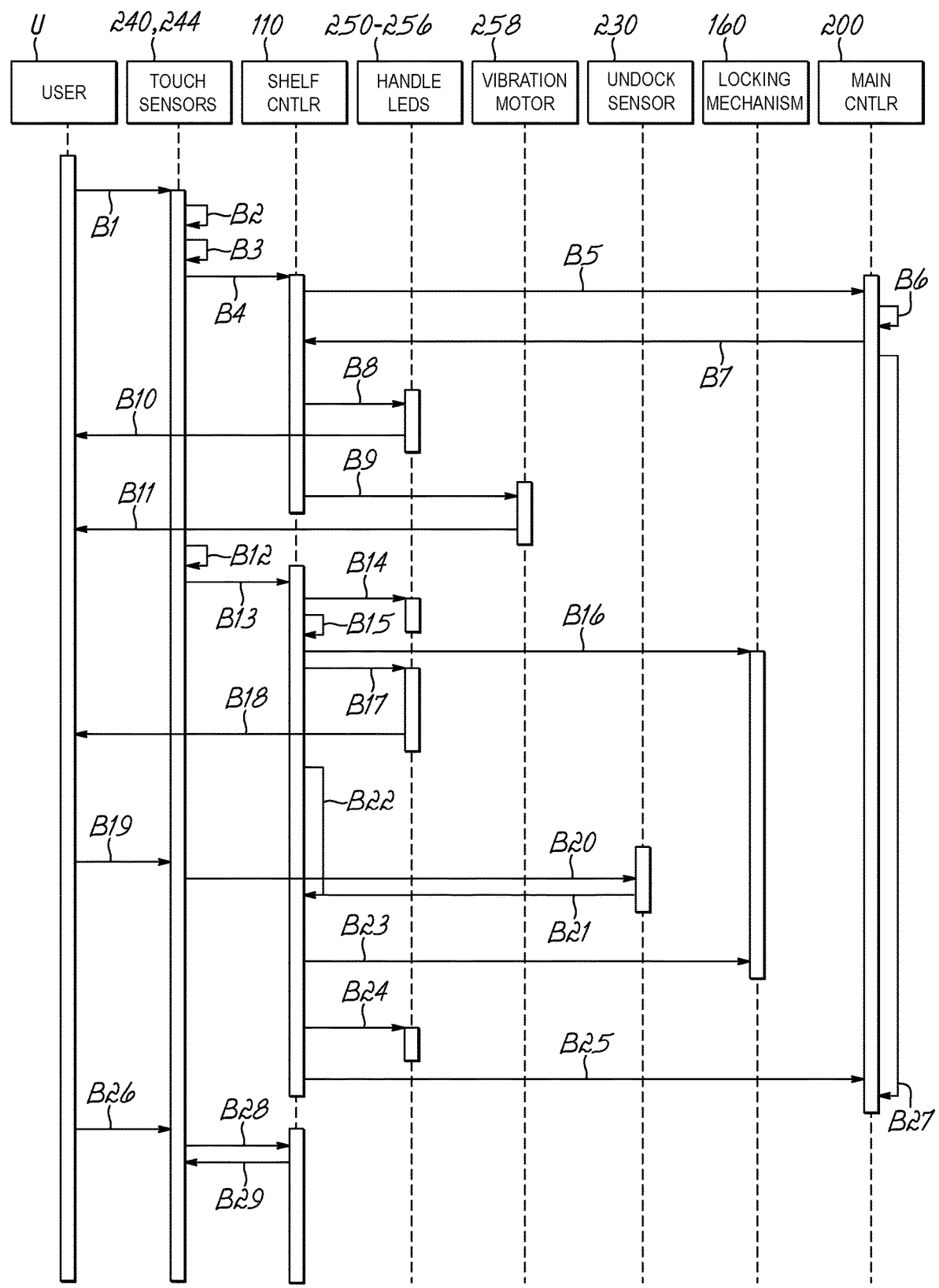
FIG. 22 is a sequence diagram showing the flow of communication between various components of the automated lab system during the method shown in FIG. 21.

Operation of the automated laboratory system 10 is illustrated in greater detail in FIG. 22, which depicts a sequence diagram showing the exemplary steps without implying the direction of communication. Initially, the shelf 20 is docked and locked, the instrument carried on the shelf 20 is online and busy, and the user U desires to undock the shelf 20. At the conclusion of the method, the shelf 20 is undocked, the instrument carried on the shelf 20 is still busy, and the robotic device 14 is blocked from accessing the shelf 20.

In response to the user U gripping B1 the handle 80, the touch is detected B2 by one or more of the touch sensors 240, 244. In response to one or more of the touch sensors 240, 244 detecting a short hold B3, the short hold trigger B4 is communicated by the touch sensors 240, 244 to the shelf controller 110. In response to receiving the short hold trigger, the shelf controller 110 sends a request B5 to the main controller 200 to unlock, while the instrument carried on the shelf 20 is busy. In response to receiving the request B5, the main controller 200 blocks B6 the robotic device 14 from accessing the shelf 20. The main controller 200 then communicates a notification B7 of the success to the shelf controller 110. In response to receiving the notification B7, the shelf controller 110 commands B8 the handle LEDs 250, 252, 254, 256 to indicate that the shelf 20 is pending unlock and send an activation signal B9 to the vibration motor. In response to receiving the command B8, the LEDs 250, 252, 254, 256 provide a visual indication B10 to the user U that unlock is pending, while the vibration motor provides a tactile indication B11 to the user U that a demand request has been made.

In response to one or more of the touch sensors 240, 244 detecting a long hold B12, since the user U has not released the handle 80, the long hold trigger B13 is communicated by the touch sensors 240, 244 to the shelf controller 110. The shelf controller 110 commands B14 the handle LEDs 250, 252, 254, 256 to indicate that the shelf 20 is ready to unlock. The shelf controller 110 waits B15 for the touch trigger (the user U is still holding the handle 80). The shelf controller 110 commands B16 the locking mechanism 160 to engage the lock release, and then commands B17 the handle LEDs 250, 252, 254, 256 to indicate that the shelf 20 is unlocked. In response to receiving the command B17, the LEDs 250, 252, 254, 256 provide a visual indication B18 to the user U that the shelf 20 can be moved out of the docked position. In response to the user U pulling B19 the handle 80, the undock sensor 230 may detect B20 the undocking of the shelf 20. The undock sensor 230 may then communicate B21 to the shelf controller 110 that the shelf 20 is undocked. The shelf controller 110 waits B22 for the undock sensor 230 to communicate that the shelf 20 is undocked. In response, the shelf controller 110 commands B23 the locking mechanism 160 to disengage the lock release and commands B24 the handle LEDs 250, 252, 254, 256 to indicate that the shelf 20 is undocked. The shelf controller 110 may then communicate B25 to the main controller 200 that the shelf 20 is undocked. The user U may then release B26 the handle 80. The main controller 200 waits B27 for the instrument carried on the shelf 20 to become idle. The touch sensors 240, 244 communicate B28 to the shelf controller 110 that no touch is detected. The shelf controller 110 may then clear B29 the touch states of the touch sensors 240, 244.

Figure 23:
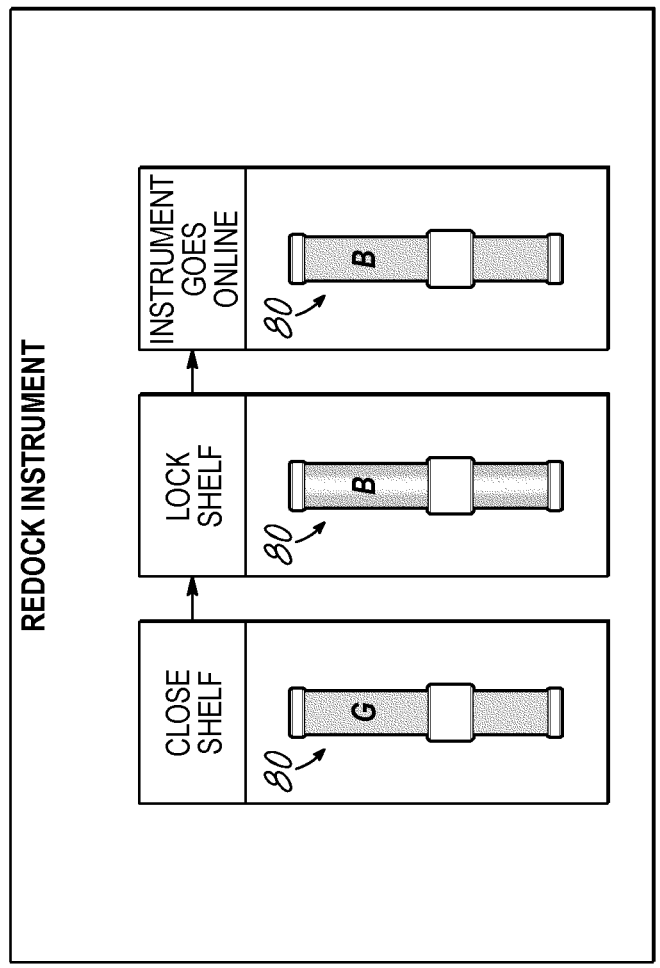
FIG. 23 is a schematic diagram of a method of using the handle to redock an instrument.

A method of redocking the shelf 20 and the instrument carried thereon is shown schematically in FIG. 23. The handle 80 is initially illuminated green by the LEDs 250, 252, 254, 256. The user grips the handle 80 and closes the shelf 20 by swinging the shelf 20 back into the docked position. In response to the shelf 20 being returned to the docked position, the shelf 20 is locked. At this time, the handle 80 is illuminated blue in a flashing manner to indicate that the shelf 20 is docked and locked. The instrument subsequently goes online. At this time, the handle 80 is illuminated blue to indicate that the instrument is ready for automation.

Figure 24:
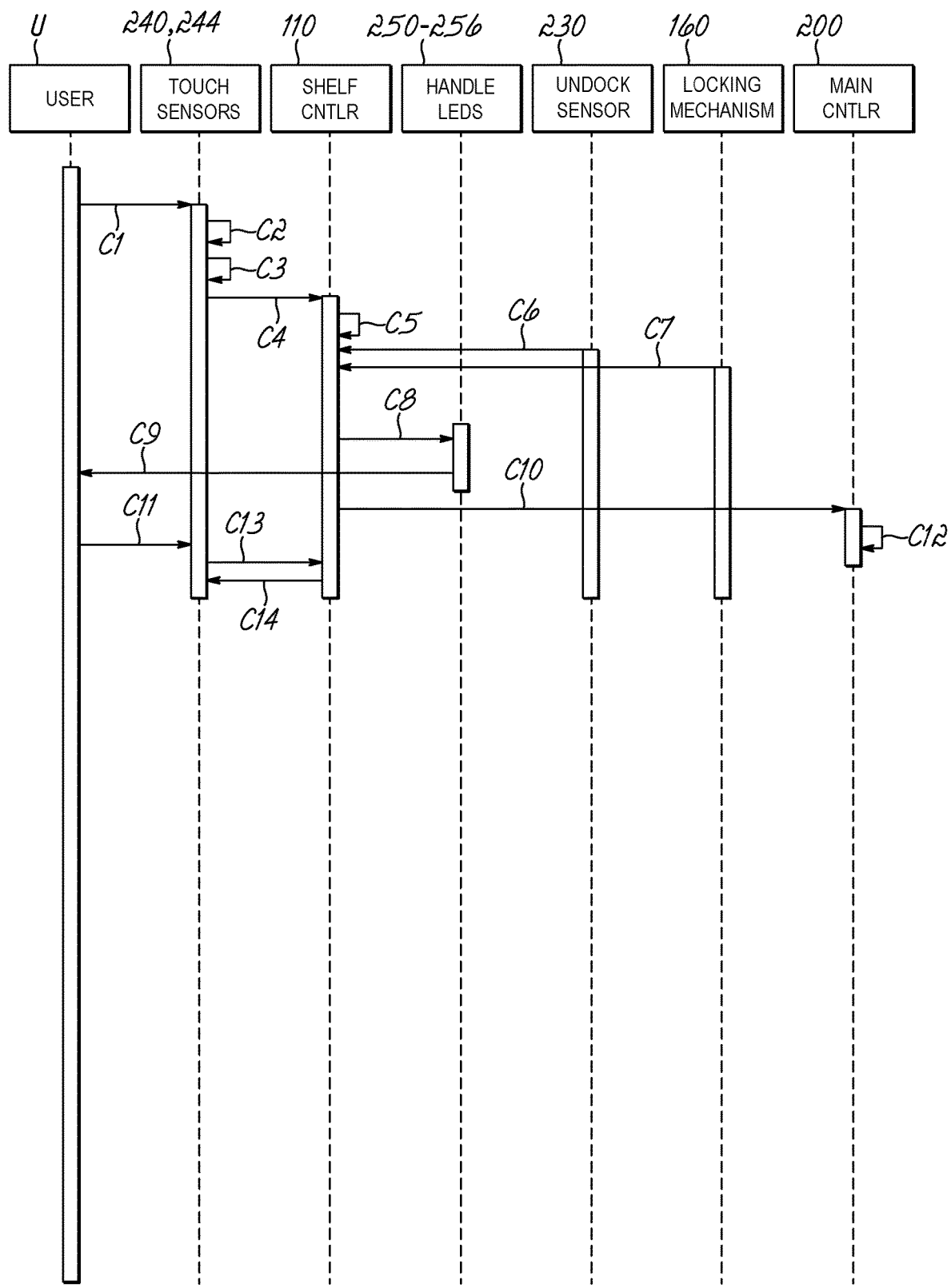
FIG. 24 is a sequence diagram showing the flow of communication between various components of the automated lab system during the method shown in FIG. 23.

Operation of the automated laboratory system 10 is illustrated in greater detail in FIG. 24, which depicts a sequence diagram showing the exemplary steps without implying the direction of communication. Initially, the shelf 20 is undocked and unlocked, and the user U desires to dock the shelf 20. At the conclusion of the method, the shelf 20 is docked and locked.

In response to the user U gripping C1 the handle 80 to start pushing the shelf 20 toward the docked position, the touch is detected C2 by one or more of the touch sensors 240, 244. In response to one or more of the touch sensors 240, 244 detecting a short hold B3, the short hold trigger C4 is communicated by the touch sensors 240, 244 to the shelf controller 110. The shelf controller 110 ignores C5 the short hold trigger because the shelf 20 is undocked. In response to the user U docking the shelf 20, the undock sensor 230 communicates C6 to the shelf controller 110 that the shelf 20 is docked, and the locking mechanism 160 locks the shelf 20 against rotation and communicates C7 to the shelf controller 110 that the shelf 20 is locked. The shelf controller 110 commands C8 the handle LEDs 250, 252, 254, 256 to indicate that the shelf 20 is docked and locked. In response, the LEDs 250, 252, 254, 256 provide a visual indication C9 to the user U that the shelf 20 is docked and locked. The shelf controller 110 may communicate C10 to the main controller 200 that the shelf 20 is docked. The user U may then release C11 the handle 80. The main controller 200 eventually places the instrument carried by the shelf 20 online C12. The touch sensors 240, 244 communicate C13 to the shelf controller 110 that no touch is detected. The shelf controller 110 may then clear C14 the touch states of the touch sensors 240, 244.

Figure 25:
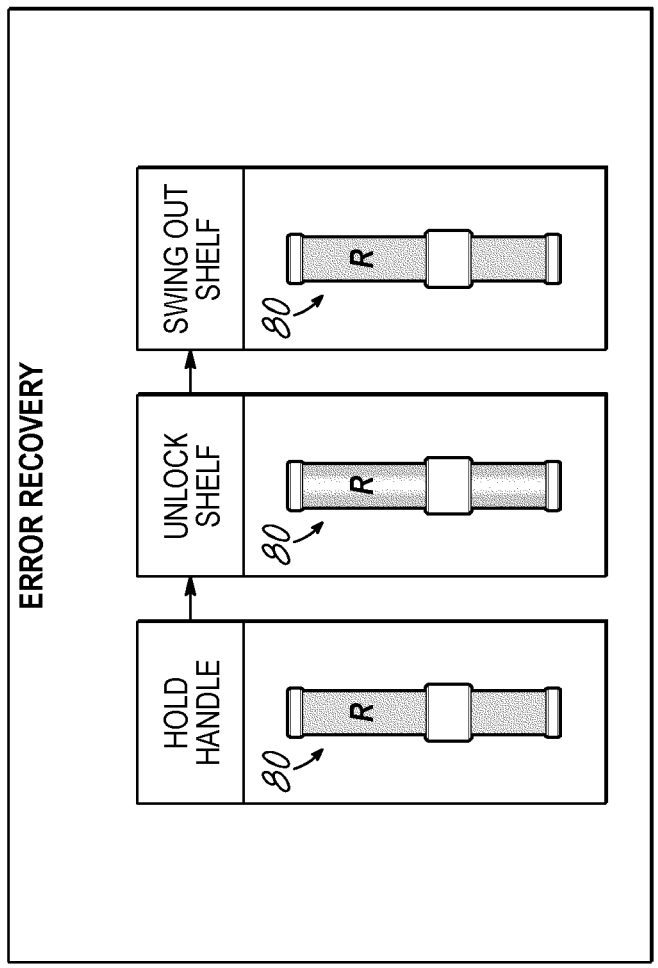
FIG. 25 is a schematic diagram of a method of using the handle for error recovery of an instrument.

A method of recovering an instrument carried by a shelf 20 from an error is shown schematically in FIG. 25. The handle 80 is initially illuminated red to indicate an error state of the instrument. The user then grips and holds the handle 80. In response to the user continuing to hold the handle 80, or applying a long hold to the handle 80, the shelf 20 is unlocked. At this time, the handle 80 is illuminated red in a flashing manner to indicate that the shelf 20 is unlocked. With the shelf 20 unlocked, the user may swing the shelf 20 out to the undocked position to access the instrument. At this time, the handle 80 is illuminated red to indicate that the instrument is still in an error state. The user may address the error state of the instrument and then perform the redocking method discussed above.

Figure 26:
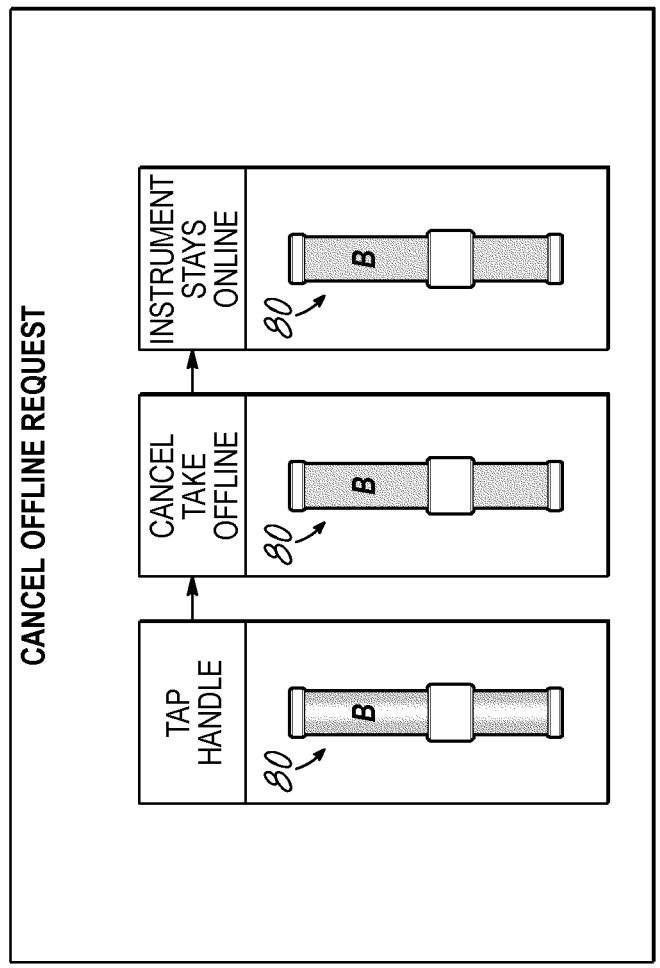
FIG. 26 is a schematic diagram of a method of using the handle to cancel an offline request.

A method of canceling an offline request, such as that discussed above with respect to FIGS. 19 and 20, is shown schematically in FIG. 26. The user taps the handle 80. In response to the user tapping the handle 80, the handle 80 is illuminated blue in a flashing manner. The request to take offline is canceled. At this time, the handle 80 is illuminated blue to indicate that the request has been canceled. The instrument then stays online, and the handle 80 remains illuminated blue.

Figure 27:
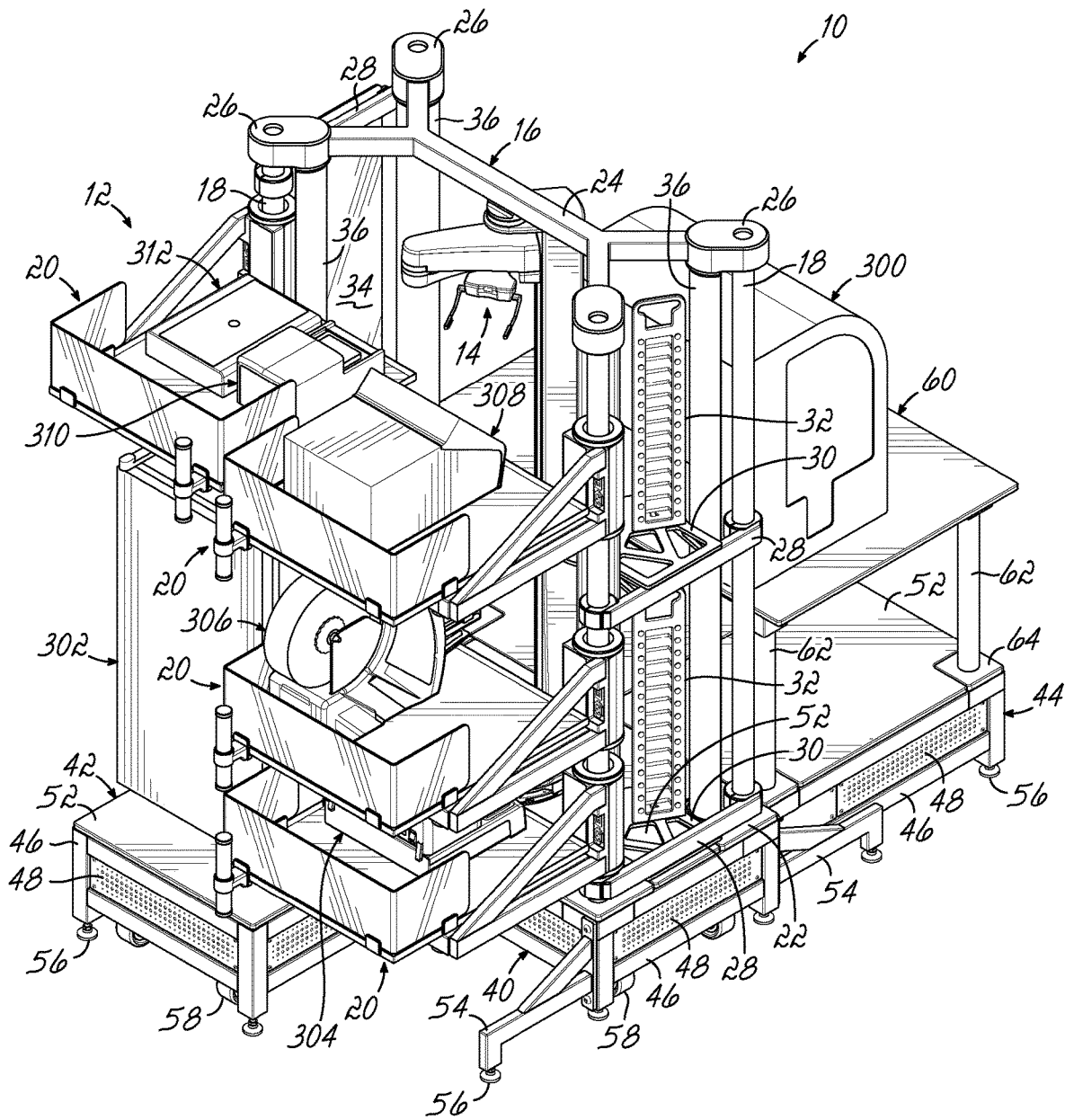
FIG. 27 is a perspective view similar to FIG. 1, showing a variety of instruments positioned on and around the vertical shelving system.

Referring now to FIG. 27, in one embodiment, a variety of scientific instruments and, more particularly, a liquid handler 300, an incubator 302, a reagent dispenser 304, a sealer 306, a microplate spectrophotometer 308, a thermocycler 310, and a thermocycler controller 312 are each positioned on or next to the vertical shelving system 12 such that the scientific instruments may be accessed by the robotic device 14 for performing a desired assay or procedure.

For example, the illustrated automated lab system may perform a DNA replication procedure. In one embodiment, the robotic device 14 may grip a sample plate (not shown) containing a target DNA and stored on one of the hotels 32, for example, and load the sample plate into the liquid handler 300. The robotic device 14 may also grip a polymerase chain reaction (PCR) plate for replicating the target DNA in and stored on one of the hotels 32, for example, and load the PCR plate into the liquid handler 300. New tips (not shown) for transferring the target DNA to the PCR plate may also be loaded onto the liquid handler 300 from a tip box (not shown) stored on one of the hotels 32, for example, by the robotic device 14. Next, the liquid handler 300 may transfer some of the target DNA from the sample plate as well as the necessary reagents to the PCR plate via the new tips. The robotic device 14 may change out the tips for a different set of new tips and transfer the necessary reagents to the PCR plate via the different set of new tips. The robotic device 14 may then grip the PCR plate and transfer the PCR plate from the liquid handler 300 to the sealer 306, which may seal the openings to the wells in the PCR plate. The robotic device 14 may grip the sample plate and transfer the sample plate from the liquid handler 300 to the incubator 302 for storage. The tips may be ejected into a receptacle (not shown), which may be gripped by the robotic device 14 and transferred to one of the hotels 32 for storage. After the openings to the wells of the PCR plate have been sealed, the robotic device 14 may grip the PCR plate and transfer the PCR plate from the sealer 306 to the thermocycler 310, whereat the target DNA sample is amplified in the PCR plate through a series of cycles in the thermocycler 310. The robotic device 14 may then grip a product assay plate (not shown) stored on one of the random access hotels 32, for example, and load the product assay plate into the reagent dispenser 304, which may pre-load the product assay plate with a Tris EDTA buffer ("TE buffer") reagent. Next, the robotic device 14 may grip the product assay plate and transfer the product assay plate to the liquid handler 300. The robotic device 14 may also grip the PCR plate and transfer the PCR plate from the thermocycler 310 to the liquid handler 300, with a new set of tips loaded therein, whereat the amplified DNA may be combined with the TE buffer reagent in the product assay plate. In one embodiment, the robotic device 14 may first transfer the PCR plate to a peeler (not shown) positioned on any of the shelves 20 or platforms 52, for example, to unseal the PCR plate so that the liquid handler 300 may aspirate some of the amplified DNA. However, the peeler (not shown) may be optional as the tips of the liquid handler 300 may be capable of piercing the seal provided on the PCR plate. Next, the robotic device 14 may grip the product assay plate and transfer the product assay plate from the liquid handler 300 to the microplate spectrophotometer 308 to verify amplification of the DNA and to determine the quantity. The robotic device 14 may grip the PCR plate and transfer the PCR plate from the liquid handler 300 to the incubator 302 for storage. The robotic device may grip the product assay plate and transfer the product assay plate from the spectrophotometer 308 to one of the hotels 32 for storage. The robotic device 14 may also grip the used tips and transfer the used tips to one of the hotels for 32 storage.

While the automated lab system 10 has been described as performing a DNA replication procedure via the liquid handler 300, incubator 302, reagent dispenser 304, sealer 306, microplate spectrophotometer 308, thermocycler 310, and thermocycler controller 312, any combination of suitable scientific instruments or lab consumables may be positioned on or next to the vertical shelving system 12 for access by the robotic device 14 to perform any desired assay or procedure. The vertical distribution of at least some of the scientific instruments on the vertical shelving system 12 significantly reduces the horizontal footprint of the automated lab system 10 as compared to conventional automated lab systems. In one embodiment, the robotic device 14 may be eliminated, and the assay or procedure may be performed manually or via one or more electromechanical devices directly incorporated into one or more of the scientific instruments, storage units, or other features of the automated lab system 10, for example.

While the handle 80 has been described for use with articulating shelves 20, it will be appreciated that the handle 80 may be used with a various other types of shelves. For example, the handle 80 may be used with linearly sliding shelves. Alternatively, the handle 80 may be used with permanently fixed shelves. In such cases, the handle may be used for communicating an offline request, for example.

Figure 28:
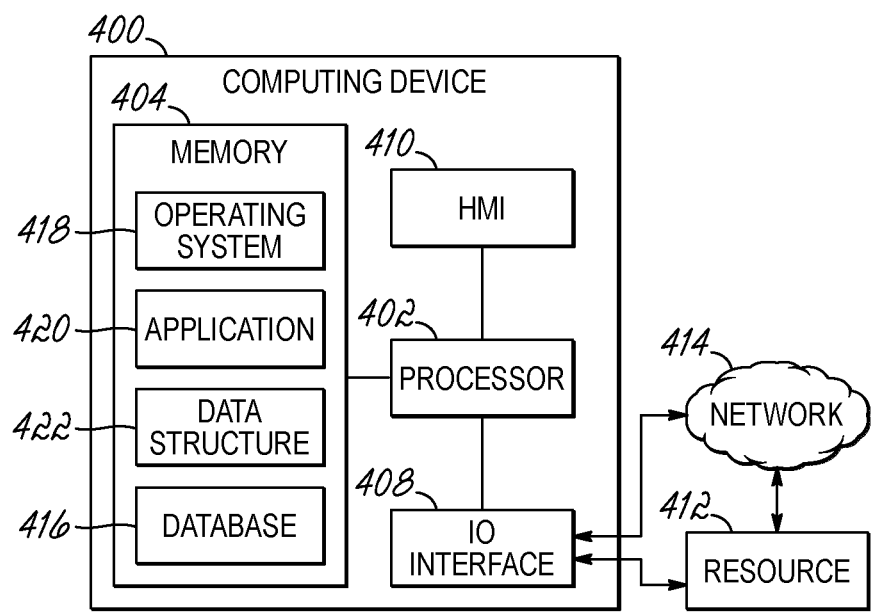
FIG. 28 is a schematic diagram of a computing device in communication with a network and resources in accordance with an aspect of the present invention.

Referring now to FIG. 28, the embodiments of the invention described above may be implemented using one or more computer devices or systems, such as exemplary computer system 400. The computer system 400 may include a processor 402, a memory 404, a mass storage memory device (not shown), an input/output (I/O) interface 408, and a user interface 410. The computer system 400 may also be operatively coupled to one or more external resources 412 via the I/O interface 408 and/or a network 414.

In one embodiment, the computer system 400 may be configured to operate the Momentum software commercially available from Thermo Fisher Scientific Inc for providing parallel or sequential processing operations using the automated laboratory system 10 of the present invention. Such software may enable standardized real-time, data-driven decision making that eliminates customized data handling, and may allow a user to define, execute and monitor complex processes in a powerful yet easy-to-use visual environment. Such software may also enable multiple workflows via real-time, data-driven decision-making, and may enable a user to specify the design, configuration and operation of their individual system and plug-in different schedulers to support a broad range of processes and workflows.

The processor 402 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 404. Memory 404 may include a single memory device or a plurality of memory devices including but not limited to read-only memory (ROM), random access memory (RAM), volatile memory, non-volatile memory, static random access memory (SRAM), dynamic random access memory (DRAM), flash memory, cache memory, or any other device capable of storing information. The mass storage memory device 406 may include data storage devices such as a hard drive, optical drive, tape drive, non-volatile solid state device, or any other device capable of storing information. A database 416 may reside on the mass storage memory device 406, and may be used to collect and organize data used by the various systems and modules described herein.

Processor 402 may operate under the control of an operating system 418 that resides in memory 404. The operating system 418 may manage computer resources so that computer program code embodied as one or more computer software applications, such as application 420 residing in memory 404 may have instructions executed by the processor 402. In an alternative embodiment, the processor 402 may execute the applications 420 directly, in which case the operating system 418 may be omitted. One or more data structures 422 may also reside in memory 404, and may be used by the processor 402, operating system 418, and/or application 420 to store or manipulate data.

The I/O interface 408 may provide a machine interface that operatively couples the processor 402 to other devices and systems, such as the network 414 and/or external resource 412. The application 420 may thereby work cooperatively with the network 414 and/or external resource 412 by communicating via the I/O interface 408 to provide the various features, functions, and/or modules comprising embodiments of the invention. The application 420 may also have program code that is executed by one or more external resources 412, or otherwise rely on functions and/or signals provided by other system or network components external to the computer system 400. Indeed, given the nearly endless hardware and software configurations possible, persons having ordinary skill in the art will understand that embodiments of the invention may include applications that are located externally to the computer system 400, distributed among multiple computers or other external resources 412, or provided by computing resources (hardware and software) that are provided as a service over the network 414, such as a cloud computing service.

The user interface 410 may be operatively coupled to the processor 402 of computer system 400 in a known manner to allow a user to interact directly with the computer system 400. The user interface 410 may include video and/or alphanumeric displays, a touch screen, a speaker, and any other suitable audio and visual indicators capable of providing information to the user. The user interface 410 may also include input devices and controls such as an alphanumeric keyboard, a pointing device, keypads, pushbuttons, control knobs, microphones, etc., capable of accepting commands or input from the user and transmitting the entered input to the processor 402.

While the present invention has been illustrated by the description of various embodiments thereof, and while the embodiments have been described in considerable detail, it is not intended to restrict or in any way limit the scope of the appended claims to such detail. Thus, the various features discussed herein may be used alone or in any combination. Additional advantages and modifications will readily appear to those skilled in the art. The present invention in its broader aspects is therefore not limited to the specific details and illustrative examples shown and described. Accordingly, departures may be made from such details without departing from the scope of the general inventive concept.

What is claimed is:

1. An automated laboratory system, comprising:
   a vertical shelving system including a frame and at least one shelf movably mounted to the frame such that the at least one shelf is movable relative to the frame between a docked position and an undocked position, the at least one shelf being configured to carry at least one instrument;
   a robotic device proximate the vertical shelving system and being configured to access the at least one instrument carried by the at least one shelf,
   at least one locking mechanism configured to lock the at least one shelf against movement relative to the frame when the at least one shelf is in the docked position;
   a main controller;
   at least one handle operatively coupled to the at least one shelf, wherein the at least one handle includes:
      at least one body portion grippable by a user's hand for receiving a force exerted by the user's hand to move the shelf between the docked position and the undocked position;
      at least one indicator for providing a discernible indication of a status of at least one of the at least one shelf or the at least one instrument; and
      at least one sensor for detecting contact or proximity between the at least one handle and the user's hand; and
   a shelf controller in operative communication with the at least one locking mechanism, the at least one indicator, the at least one sensor, and the main controller, wherein the shelf controller is configured to send an unlock signal to the at least one locking mechanism in response to the sensor detecting contact or proximity between the at least one handle and the user's hand for a predetermined amount of time, and wherein the shelf controller is configured to send a request to the main controller to take the at least one instrument offline in response to the sensor detecting contact or proximity between the at least one handle and the user's hand for a predetermined amount of time.

2. The automated laboratory system of claim 1, wherein the main controller is in operative communication with the robotic device.

3. The automated laboratory system of claim 1, wherein the at least one shelf is rotatably mounted to the frame.

4. The automated laboratory system of claim 1, wherein the at least one indicator includes at least one visual indicator for providing a visual indication of a status of at least one of the at least one shelf or the at least one instrument.

5. The automated laboratory system of claim 4, wherein the at least one visual indicator includes at least one light source.

6. The automated laboratory system of claim 1, wherein the at least one indicator includes at least one tactile indicator for providing a tactile indication of a status of at least one of the at least one shelf or the at least one instrument.

7. The automated laboratory system of claim 6, wherein the at least one tactile indicator includes at least one vibration source.

8. The automated laboratory system of claim 1, wherein the at least one sensor includes at least one contact or proximity sensor.

9. The automated laboratory system of claim 1, wherein the status includes at least one of an online status of the at least one instrument, an offline status of the at least one instrument, a transition between online and offline statuses of the at least one instrument, a docked status of the at least one shelf, an undocked status of the at least one shelf, or a transition between docked and undocked statuses of the at least one shelf.

10. The automated laboratory system of claim 1, further comprising:
at least one instrument carried by the at least one shelf, wherein the main controller is in operative communication with the at least one instrument.

* * * * *